(12) United States Patent
Kile

(10) Patent No.: US 9,723,791 B1
(45) Date of Patent: Aug. 8, 2017

(54) CONCAVES FOR AN AGRICULTURAL COMBINE

(71) Applicant: Kevin J. Kile, Spokane, WA (US)

(72) Inventor: Kevin J. Kile, Spokane, WA (US)

(*) Notice: Subject to any disclaimer, the term of this patent is extended or adjusted under 35 U.S.C. 154(b) by 0 days.

(21) Appl. No.: 15/361,633

(22) Filed: Nov. 28, 2016

Related U.S. Application Data

(63) Continuation-in-part of application No. 15/224,054, filed on Jul. 29, 2016, which is a continuation of application No. 14/197,595, filed on Mar. 5, 2014, now Pat. No. 9,504,204.

(51) Int. Cl.
*A01F 12/24* (2006.01)
*A01F 7/06* (2006.01)

(52) U.S. Cl.
CPC ............ *A01F 12/24* (2013.01); *A01F 7/06* (2013.01)

(58) Field of Classification Search
CPC ........... A01F 12/24; A01F 12/26; A01F 12/28
USPC ....................................................... D15/28
See application file for complete search history.

(56) References Cited

U.S. PATENT DOCUMENTS

| | | | |
|---|---|---|---|
| 2,159,664 A | 5/1939 | Lindgren | |
| 2,457,259 A | 12/1948 | Moll | |
| 3,439,684 A | 4/1969 | Davidow et al. | |
| 3,515,145 A | 6/1970 | Herbsthofer | |
| 3,537,459 A | 11/1970 | Thomas | |
| 3,568,682 A | 3/1971 | Knapp | |
| 3,678,938 A * | 7/1972 | De Coene | A01F 12/442 460/73 |
| 3,678,939 A | 7/1972 | Key, III et al. | |
| 3,734,103 A | 5/1973 | Mathews | |
| 3,871,384 A | 3/1975 | Depauw et al. | |
| 3,891,152 A | 6/1975 | Guggenheimer | |
| 4,031,901 A | 6/1977 | Rowland-Hill | |
| 4,383,652 A | 5/1983 | Osborne et al. | |
| 4,711,075 A | 12/1987 | Strong | |
| 4,711,252 A | 12/1987 | Bernhardt et al. | |
| 4,875,891 A * | 10/1989 | Turner | A01F 12/442 460/108 |
| 4,909,772 A | 3/1990 | Kuchar | |
| 4,988,326 A | 1/1991 | Bennett | |

(Continued)

FOREIGN PATENT DOCUMENTS

| | | | |
|---|---|---|---|
| DE | 3303413 A1 | 8/1984 | |
| DE | 102011055493 A1 * | 5/2013 | ............. A01F 12/26 |

*Primary Examiner* — Árpád Fábián-Kovács
(74) *Attorney, Agent, or Firm* — Michael W. Goltry; Robert A. Parsons; Parsons & Goltry

(57) ABSTRACT

A concave for an agricultural combine includes a frame having curved members, and angle members each having opposite ends, a corner segment, a straight threshing segment including a threshing edge, and a straight separating segment having a separating grate. Each of the opposite ends of each of the angle members is non-destructively held in a respective one of a plurality of corresponding angle slots of the curved members. The angle members extend between the curved members, are spaced from one another and extend axially between the curved members forming openings therebetween for grain to pass through, the threshing edge of each one of the angle members is adjacent to top edges of the respective curved members, and the separating grate of each one of the angle members extends across an adjacent one of the openings for separating grain from threshed crop material.

5 Claims, 28 Drawing Sheets

(56) References Cited

U.S. PATENT DOCUMENTS

| | | | |
|---|---|---|---|
| 5,024,631 A | 6/1991 | Heidjann et al. | |
| 5,919,087 A | 7/1999 | Strong et al. | |
| 6,193,604 B1 | 2/2001 | Ramp et al. | |
| 6,358,142 B1 * | 3/2002 | Imel | A01F 12/28 460/107 |
| 6,485,364 B1 | 11/2002 | Gryspeerdt et al. | |
| 6,537,148 B2 * | 3/2003 | Schwersmann | A01F 12/442 460/107 |
| 7,153,204 B2 * | 12/2006 | Esken | A01F 12/28 460/109 |
| 7,285,043 B2 | 10/2007 | Foster et al. | |
| D624,939 S | 10/2010 | Flickinger et al. | |
| 8,454,416 B1 | 6/2013 | Estes | |
| 8,628,390 B2 | 1/2014 | Baltz et al. | |
| 8,690,652 B1 * | 4/2014 | Estes | A01F 12/24 460/107 |
| 8,721,411 B2 | 5/2014 | Reiger et al. | |
| 9,119,349 B2 * | 9/2015 | Ricketts | A01F 12/26 |
| 9,149,001 B2 * | 10/2015 | Holtmann | A01F 12/26 |
| 9,215,845 B2 | 12/2015 | Regier | |
| 2005/0197176 A1 | 9/2005 | Foster et al. | |
| 2007/0178951 A1 | 8/2007 | Voss et al. | |
| 2014/0087793 A1 * | 3/2014 | Regier | A01F 12/446 460/59 |

\* cited by examiner

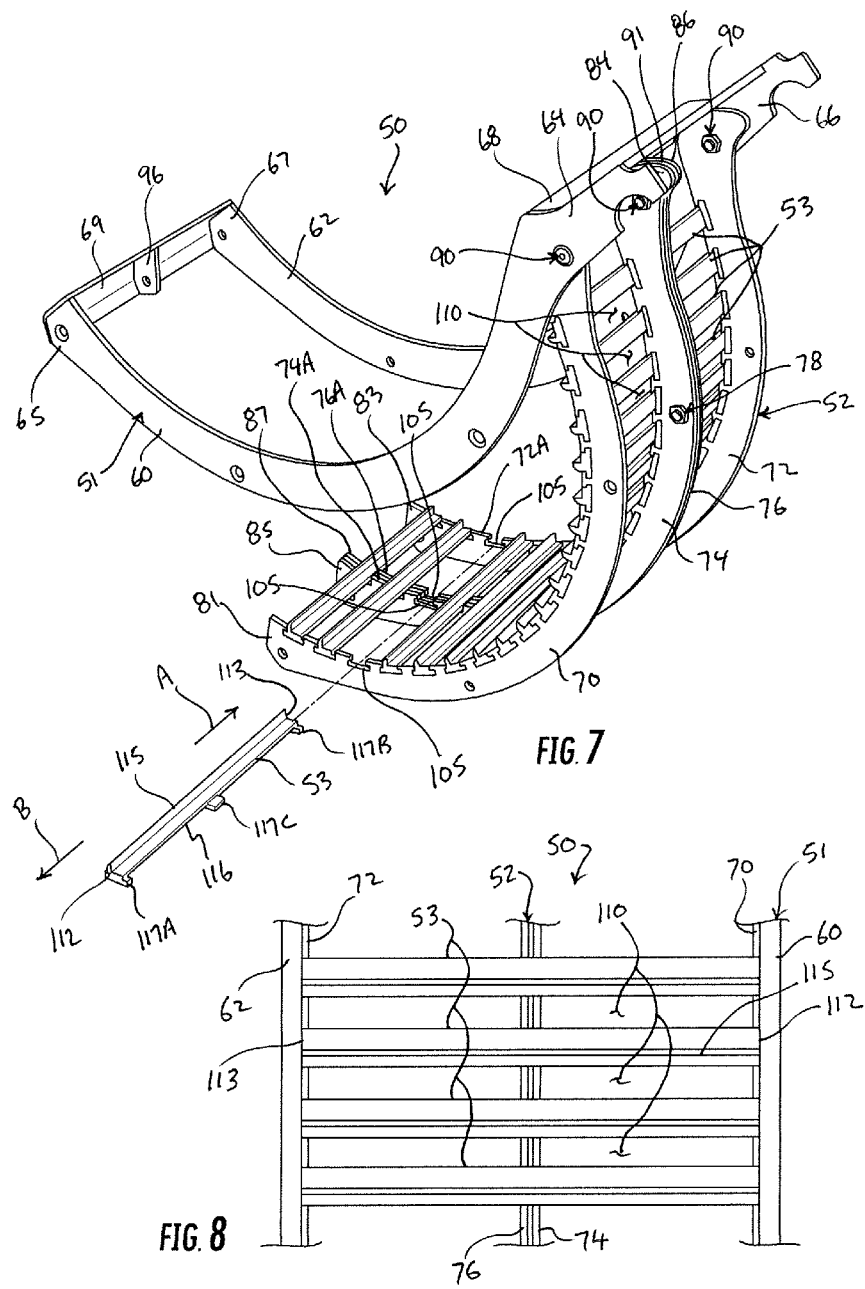

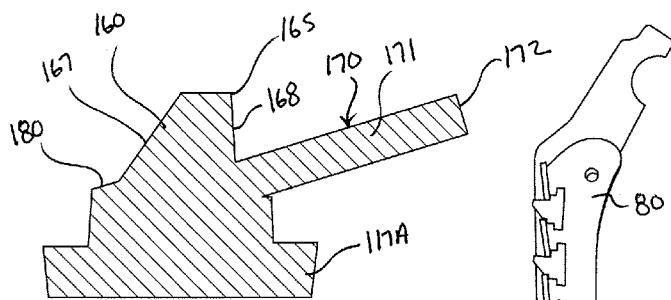
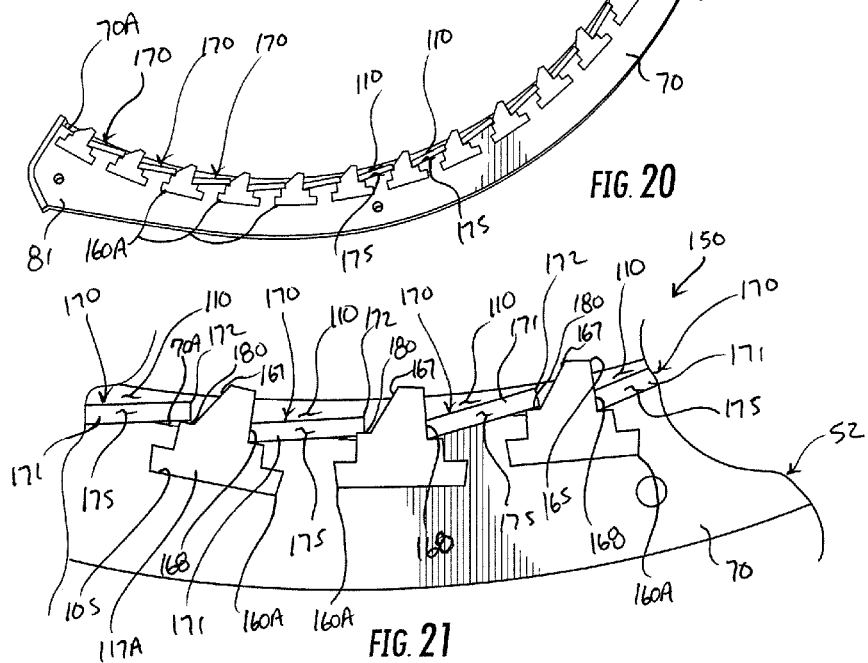
FIG. 19
FIG. 20
FIG. 21

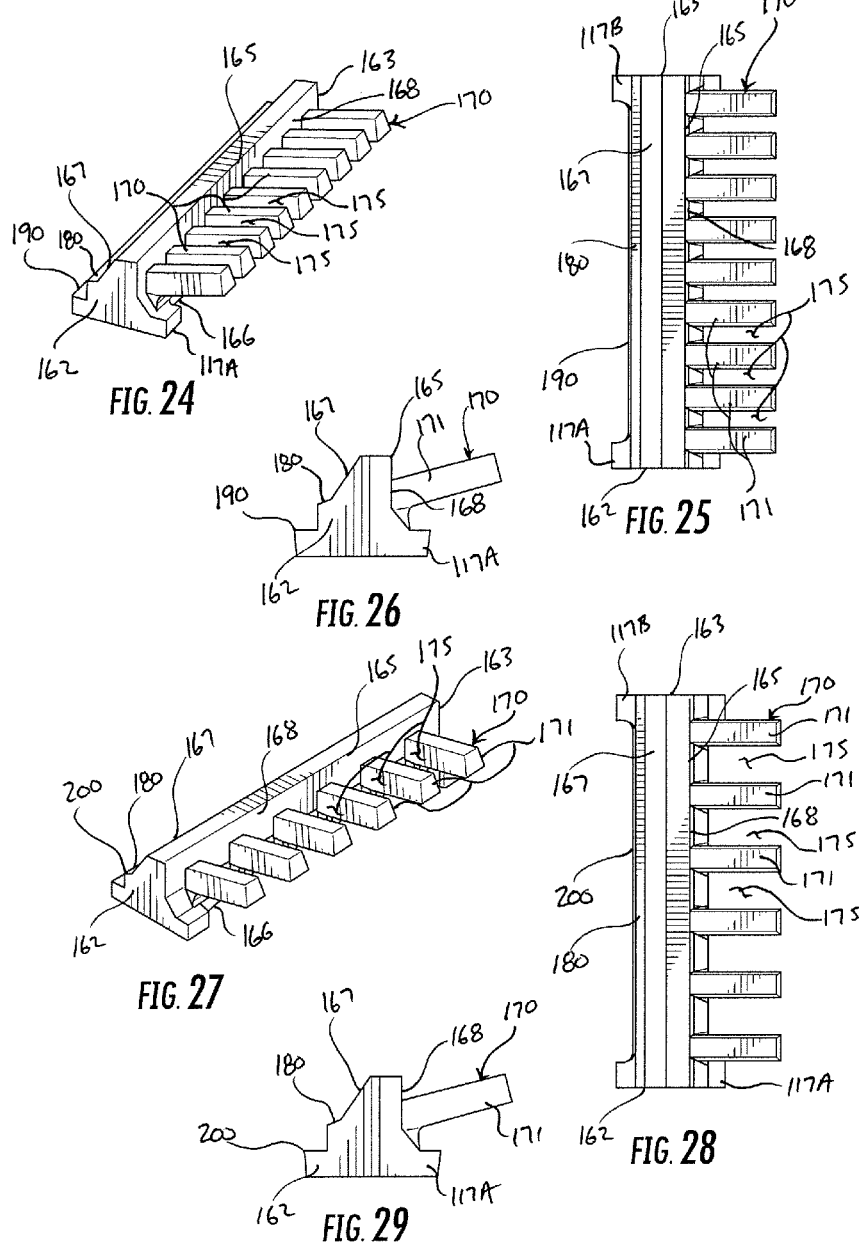

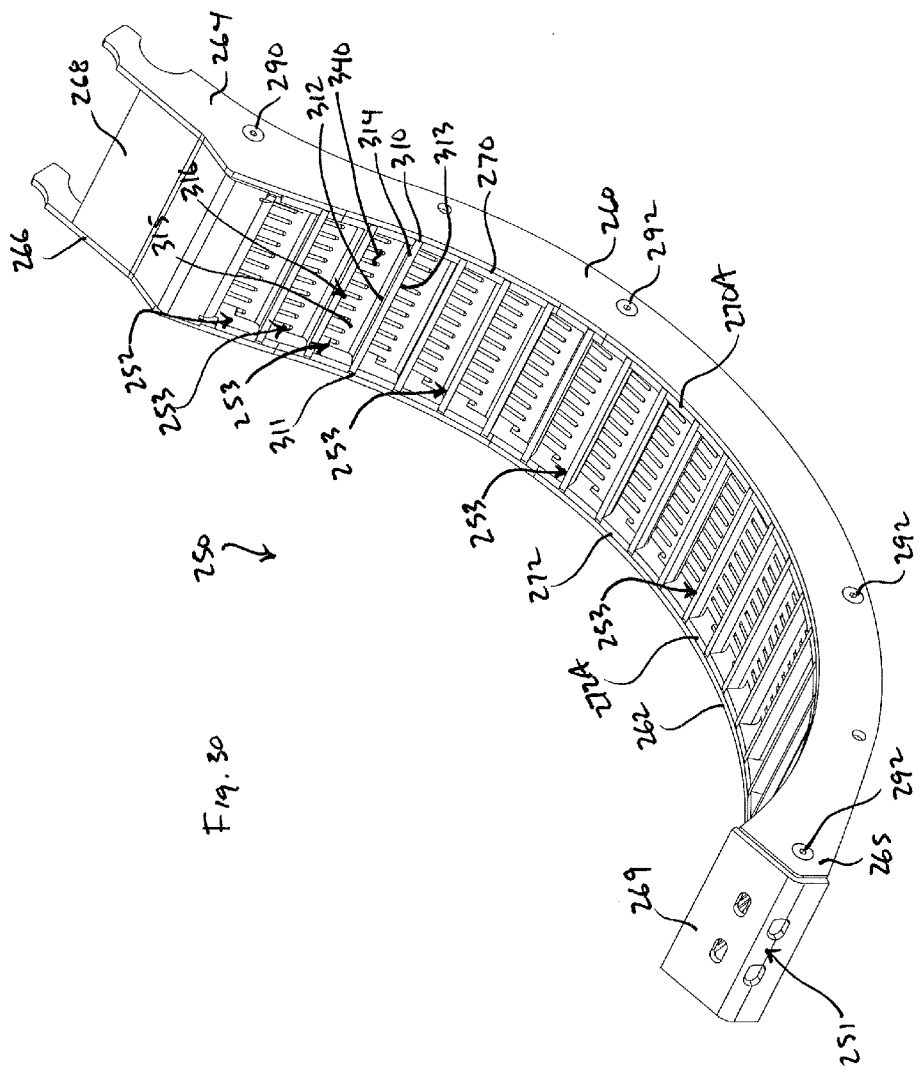

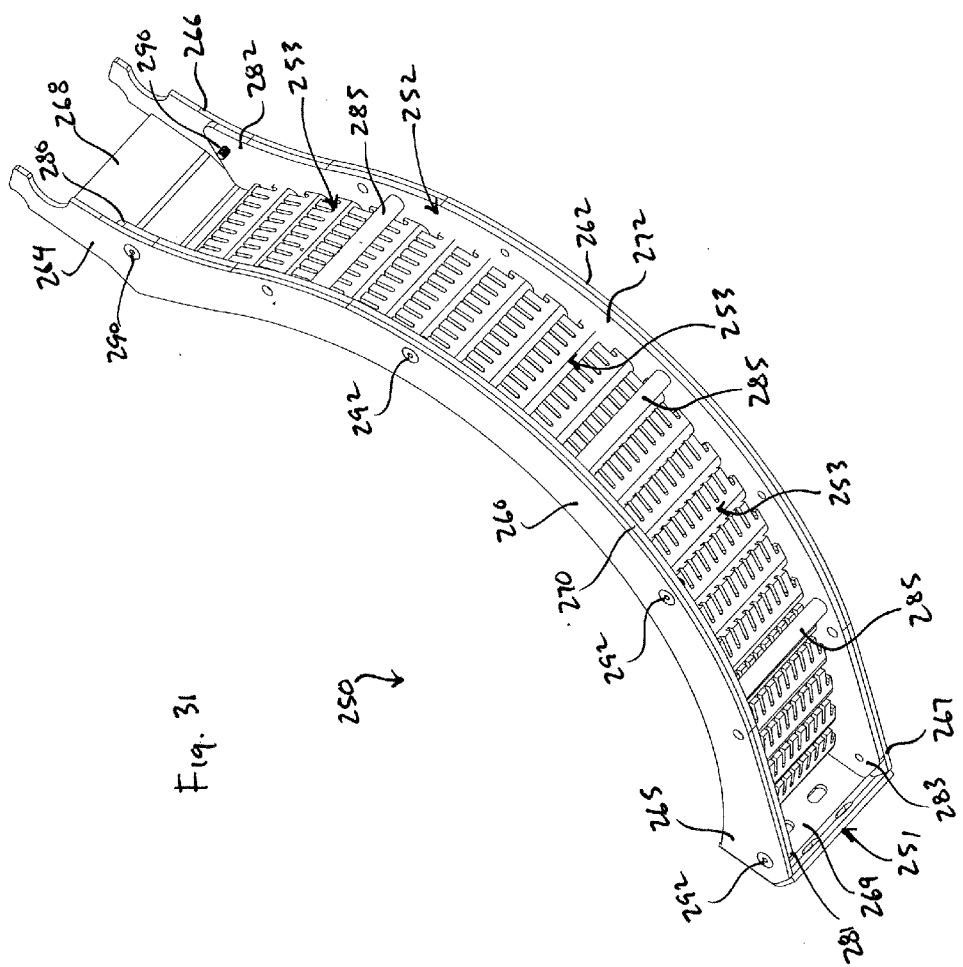

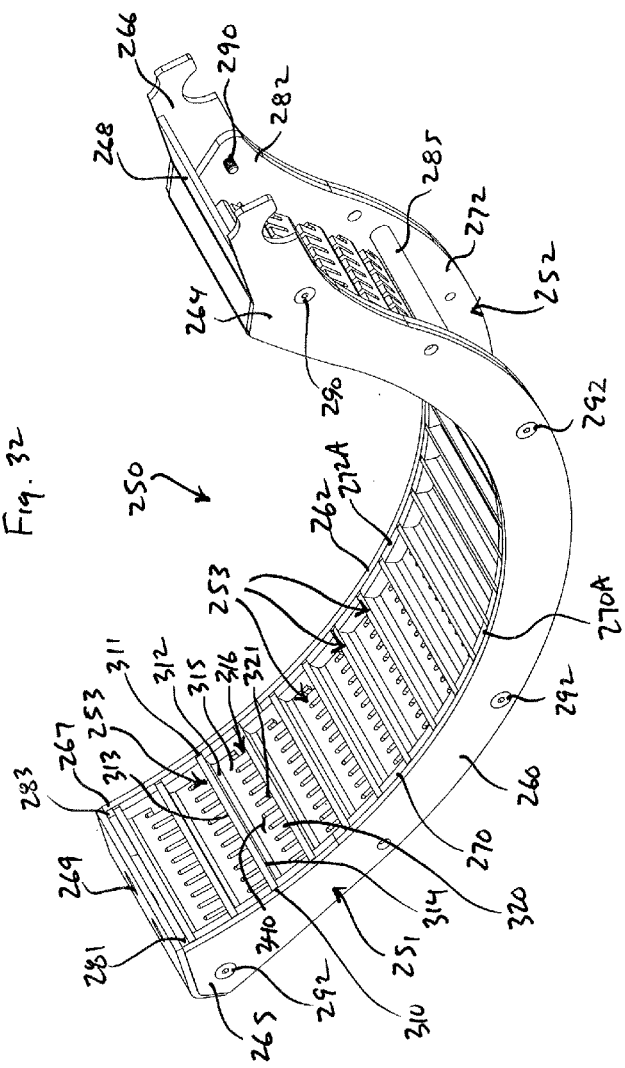

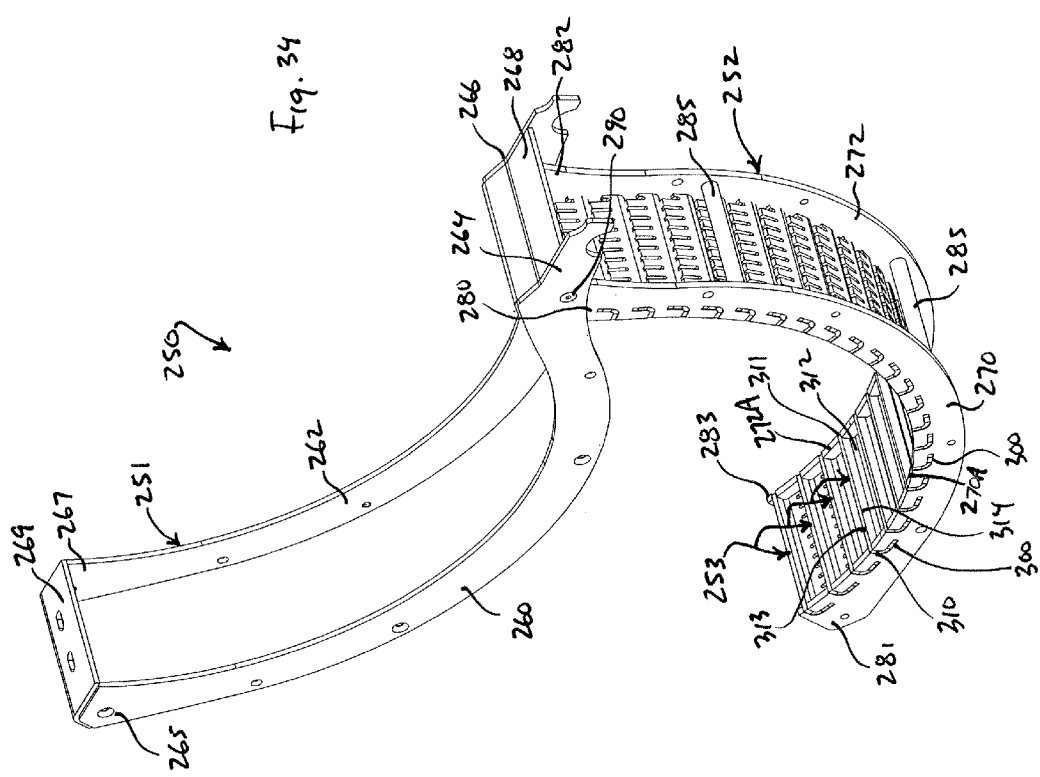

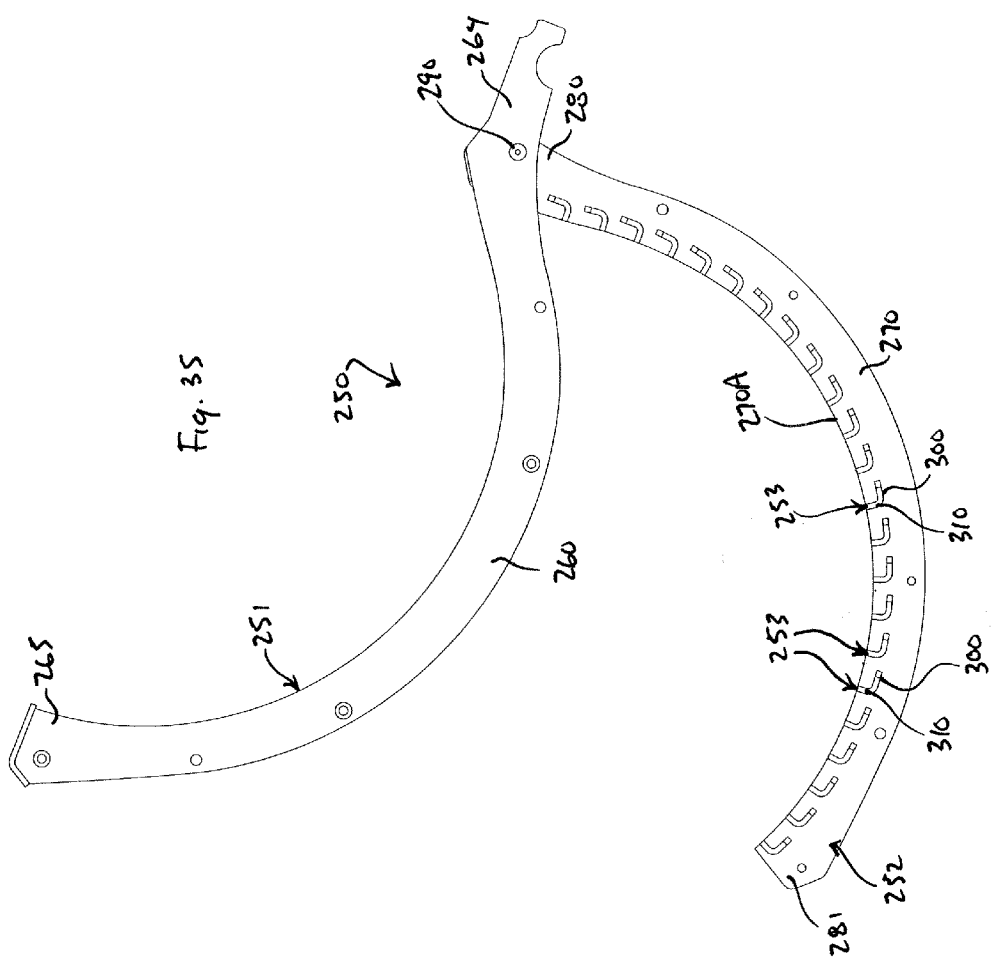

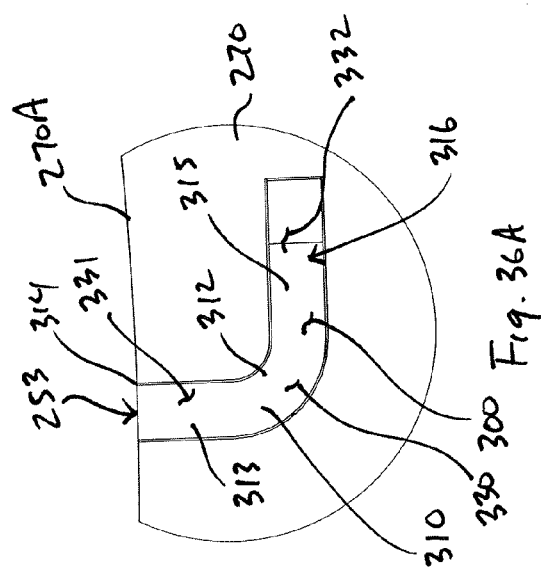

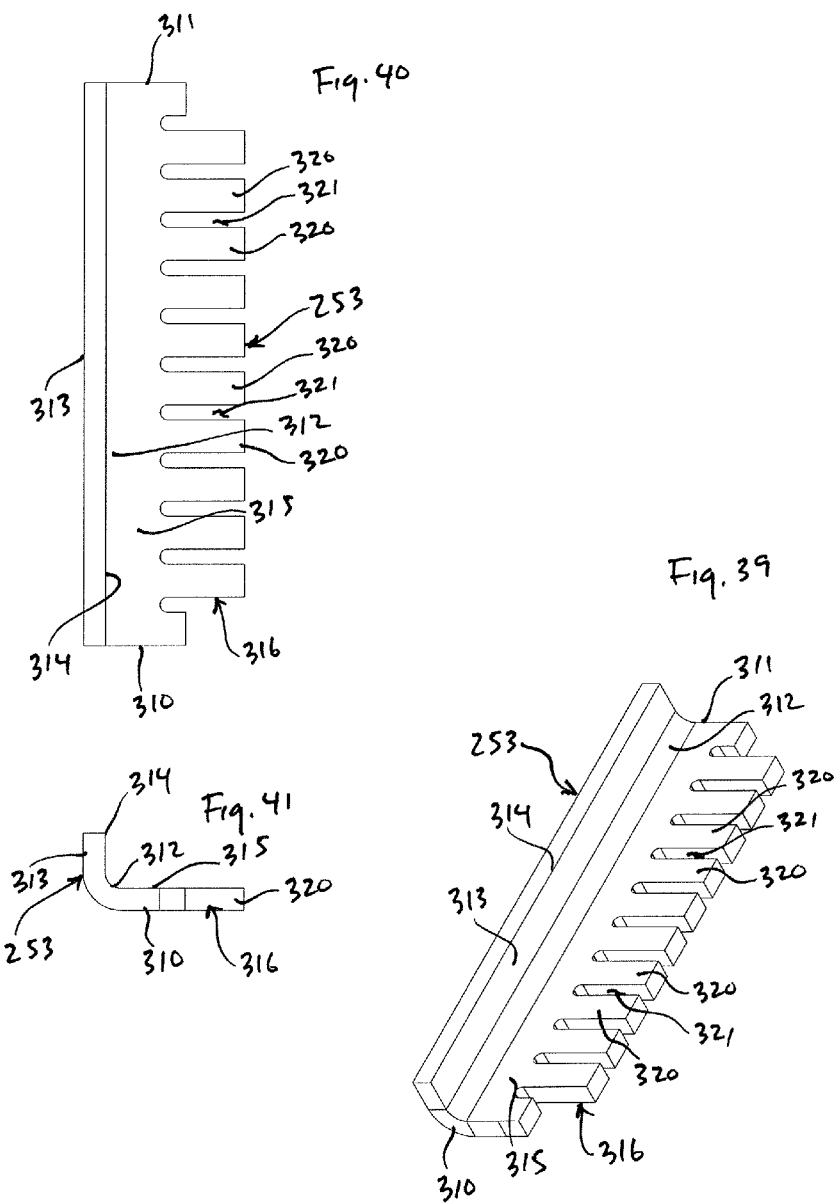

CONCAVES FOR AN AGRICULTURAL COMBINE

FIELD OF THE INVENTION

The present invention relates to agricultural combines and, more particularly, to concaves for agricultural combines.

BACKGROUND OF THE INVENTION

Agricultural combines are large machines that harvest, thresh, separate and clean an agricultural crop. The resulting clean grain is stored in a grain tank located on the combine. The clean grain is transported from the grain tank to a truck, grain cart or other receiving bin by an unloading auger.

In general, an agricultural combine includes a harvesting platform, a feederhouse, a threshing drum mounted in close proximity to a concave, sieves, a collection or bulk tank, and various conveyors, such as rotating belts and spinning augers. The harvesting platform gathers and cuts the crop near ground level and directs the harvested crop to the feederhouse, which applies the harvested crop to the threshing drum. The harvested crop is threshed between the rotating threshing drum and the concave separating the grains from the chaff to form threshings, namely, the chaff and the separated grains. The threshings are applied to a cleaning system, which separates the grains from the chaff, applies the grains to the collection or bulk tank that is periodically emptied into a truck, grain cart or other receiving bin by an unloading auger, and discharges the chaff onto the field.

The concave generally includes an array of straight bars that extend parallel to the threshing drum axis of rotation. The curved bars are permanently welded to curved end members. Curved wires, which project through the bars in some concaves and that underlie the bars in other concave designs, extend circumferentially along the concave. A concave of this type forms a grate through which the majority of the threshed grain and chaff fall onto a collecting assembly where it is directed to the cleaning system of the combine.

A concave must be periodically replaced when the bars wear down or when they are bent or broken by rocks, wire, and other foreign matter that is inadvertently drawn into the combine. Replacing a concave is difficult and time-consuming work, and especially costly when the need arises during a harvest. Accordingly, there is a need in the art for a concave that is easily and inexpensively serviceable without the need for replacement or removal from a combine, and that is easy to construct and assemble, and that eliminates extended downtimes during harvest.

SUMMARY OF THE INVENTION

According to the principle of the invention, a concave for an agricultural combine includes a frame assembly, and threshing bars. The frame assembly includes a first frame connected to a second frame for movement between an open position and a closed position relative to the second frame. The first frame includes curved members axially spaced from one another. An engagement assembly non-destructively connects each of the threshing bars to the curved members of the first frame, the threshing bars are spaced from one another, and extend axially between the curved members forming openings therebetween for grain to pass through. The threshing bars are non-destructively connected to the first frame via the engagement assemblies, when the first frame is in the open position relative to the second frame and when the first frame is in the closed position relative to the second frame. The engagement assemblies allow independent non-destructive removal of the threshing bars relative to one another from the first frame, when the first frame is in the open position relative to the second frame. The second frame restrains independent non-destructive removal of the threshing bars relative to one another from the first frame via the engagement assemblies, when the first frame is in the closed position relative to the second frame. The first frame is pivotally connected to the second frame for movement between the open position and the closed position relative to the second frame. The second frame includes curved stops axially spaced from one another. The curved stops are juxtaposed on either side of the respective curved members and restrain the threshing bars from being independently non-destructively removed from the first frame via the engagement assemblies, when the first frame is in the closed position relative to the second frame. Each engagement assembly includes engagement elements carried by each of the threshing bars and corresponding complemental engagement elements carried by the first frame. The engagement assemblies restrict axial rotation of the respective threshing bars relative to the first frame. Each of the engagement elements is one of a tongue and a slot, and each of the complemental engagement elements is the other one of the tongue and the slot.

According to the principle of the invention, a concave for an agricultural combine includes a frame assembly and threshing bars each including a separating grate. The frame assembly includes a first frame connected to a second frame for movement between an open position and a closed position relative to the second frame. The first frame includes curved members axially spaced from one another. An engagement assembly non-destructively connects each of the threshing bars to the curved members of the first frame, the threshing bars are spaced from one another and extend axially between the curved members forming openings therebetween for grain to pass through, and the separating grate of each one of the threshing bar extends across an adjacent one of the openings for separating grain from threshed crop material. The threshing bars are non-destructively connected to the first frame via the engagement assemblies, when the first frame is in the open position relative to the second frame and when the first frame is in the closed position relative to the second frame. The engagement assemblies allow independent non-destructive removal of the threshing bars from the first frame, when the first frame is in the open position relative to the second frame. The second frame restrains independent non-destructive removal of the threshing bars relative to one another from the first frame via the engagement assemblies, when the first frame is in the closed position relative to the second frame. The separating grate of each threshing bar includes parallel fingers axially spaced from one another. The first frame is pivotally connected to the second frame for movement between the open and the closed position relative to the second frame. The second frame includes curved stops axially spaced from one another. The curved stops are juxtaposed on either side of the respective curved members and restrain the threshing bars from being independently non-destructively removed from the first frame via the engagement assemblies, when the first frame is in the closed position relative to the second frame. Each engagement assembly includes engagement elements carried by each of the threshing bars and corresponding complemental engagement elements carried by the first frame. The engagement assemblies restrain axial rotation of the respective threshing bars relative to the first frame. Each of the engagement elements is one of a tongue and a slot, and each of the complemental engagement elements is the other one of the tongue and the slot.

According to the principle of the invention, a concave for an agricultural combine includes a first frame, a second frame, and threshing bars. The first frame includes curved members axially spaced from one another. An engagement assembly non-destructively connects each of the threshing bars to the curved members of the first frame, the threshing bars are spaced from one another, and extend axially between the curved members forming openings therebetween for grain to pass through. The engagement assemblies allow independent non-destructive removal of the threshing bars relative to one another from the first frame, when the second frame is spaced apart from the first frame. The second frame restrains independent non-destructive removal of the threshing bars relative to one another from the first frame via the engagement assemblies, when the second frame is juxtaposed relative to the first frame. The threshing bars are non-destructively connected to the first frame via the engagement assemblies, when the second frame is spaced apart from the and when the second frame is juxtaposed relative to the first frame. The second frame includes curved stops axially spaced from one another. The curved stops are juxtaposed on either side of the respective curved members and interact with the threshing bars restraining the threshing bars from being independently non-destructively removed relative to one another from the first frame, when the second frame is juxtaposed relative to the first frame. Each engagement assembly includes engagement elements carried by each of the threshing bars and corresponding complemental engagement elements carried by the first frame. The engagement assemblies restrain axial rotation of the respective threshing bars relative to the first frame. Each of the engagement elements is one of a tongue and a slot, and each of the complemental engagement elements is the other one of the tongue and the slot.

According to the principle of the invention, a concave for an agricultural combine includes a first frame, and angle members. The first frame includes curved members axially spaced from one another. Each of the curved members has a top edge and angle slots. The angle slots are spaced apart from one another. The angle slots of one of the curved members correspond with the angle slots of the other one of the curved members, and the angle slots each have an angle profile. Each of the angle members has opposite ends and has an angle profile and is straight in longitudinal extent from one of the opposite ends to the other one of the opposite ends, a corner segment, a straight threshing segment including a threshing edge, and a straight separating segment having a separating grate. The straight threshing segment extends from the corner segment to the threshing edge, the straight separating segment extends from the corner segment to the separating grate, and the threshing edge and the separating grate extend between the opposite ends. Each of the opposite ends of each of the angle members is non-destructively held in a respective one of the corresponding angle slots of the curved members, and the angle profile of each of the angle slots corresponds to the angle profile of each of the opposite ends of each one of the angle members preventing axial rotation of each of the angle members relative to the first frame. The angle members extend between the curved members, are spaced from one another and extend axially between the curved members forming openings therebetween for grain to pass through. The threshing edge of each one of the angle members is adjacent to the top edges of the respective curved members, and the separating grate of each one of the angle members extends across an adjacent one of the openings for separating grain from threshed crop material. There is also a second frame. The first frame is connected to the second frame for movement between an open position and a closed position relative to the second frame. Each of the opposite ends of each of the angle members is non-destructively held in the respective one of the corresponding angle slots of the curved members, when the first frame is in the open position relative to the second frame and when the first frame is in the closed position relative to the second frame. Each of the opposite ends of each of the angle members is non-destructively removable from the respective one of the corresponding angle slots of the curved members, when the first frame is in the open position relative to the second frame. The second frame restrains each of the opposite ends of each of the angle members from being non-destructively removed from the respective one of the corresponding angle slots of the curved members, when the first frame is in the closed position relative to the second frame. The first frame is connected pivotally to the second frame for movement between the open position and the closed position relative to the second frame. The second frame includes curved stops axially spaced from one another, the curved stops are juxtaposed on either side of the respective curved members on either side of the respective opposite ends of the respective angle members.

According to the principle of the invention, a concave for an agricultural combine includes a first frame, a second frame, and angle members. The first frame includes curved members axially spaced from one another. Each of the curved members has a top edge and angle slots. The angle slots are spaced apart from one another. The angle slots of one of the curved members correspond with the angle slots of the other one of the curved members, and the angle slots each have an angle profile. Each of the angle members has opposite ends and has an angle profile and is straight in longitudinal extent from one of the opposite ends to the other one of the opposite ends, a corner segment, a straight threshing segment including a threshing edge, and a straight separating segment having a separating grate. The straight threshing segment extends from the corner segment to the threshing edge. The straight separating segment extends from the corner segment to the separating grate. The threshing edge and the separating grate extend between the opposite ends. Each of the opposite ends of each of the angle members is non-destructively held in a respective one of the corresponding angle slots of the curved members, and the angle profile of each of the angle slots corresponds to the angle profile of each of the opposite ends of each one of the angle members preventing axial rotation of each of the angle members relative to the first frame. The angle members extend between the curved members, are spaced from one another and extend axially between the curved members forming openings therebetween for grain to pass through. The threshing edge of each one of the angle members is adjacent to the top edges of the respective curved members, and the separating grate of each one of the angle members extends across an adjacent one of the openings for separating grain from threshed crop material. The second frame is connected releasably to the first frame. The second frame restrains each of the opposite ends of each of the angle members from being non-destructively removed from the respective one of the corresponding angle slots of the curved members. The second frame includes curved stops axially spaced from one another. The curved stops are juxtaposed on either side of the respective curved members on either side of the respective opposite ends of the respective angle members.

BRIEF DESCRIPTION OF THE DRAWINGS

Referring to the drawings:

FIG. 7 is a view similar to that of FIG. 4 illustrating a bar removed from the inner frame of the concave;

FIG. 8 is a top plan view of a section of the concave of FIGS. 1-3 illustrating the outer frame capturing bars carried by the inner frame;

FIG. 19 is a section view taken along line 19-19 of FIG. 16;

FIG. 20 is a side elevation view of the inner frame and the bars installed on the inner frame;

FIG. 21 is an enlarged fragmented view of a segment of the inner frame of FIG. 20 showing the interaction between bars installed on the inner frame;

FIG. 24 is a perspective view of an alternate embodiment of a bar formed with an integrated grate according to the principle of the invention;

FIG. 25 is a top plan view of the embodiment of FIG. 24;

FIG. 26 is a side elevation view of the embodiment of FIG. 24, the opposite side elevation view being the same thereof;

FIG. 27 is a perspective view of an alternate embodiment of a bar formed with an integrated grate according to the principle of the invention;

FIG. 28 is a top plan view of the embodiment of FIG. 27;

FIG. 29 is a side elevation view of the embodiment of FIG. 27, the opposite side elevation view being the same thereof;

FIGS. 30-32 are perspective views of a concave constructed and arranged in accordance with the principle of the invention, the concave includes parallel angle members carried by an inner frame connected to an outer frame;

FIGS. 33 and 34 are perspective views of the embodiment of FIGS. 30-32 shown as it would appear open;

FIG. 35 is a side elevation view of the embodiment of FIGS. 33 and 34;

FIGS. 36A and 36B are enlarged, fragmentary side elevation views corresponding to FIG. 35 illustrating either side of an angle member carried by the inner frame;

FIG. 39 is a front perspective view of an angle member of the concave illustrated in FIGS. 30-32;

FIG. 40 is a top plan view of the embodiment of FIG. 39; and

FIG. 41 is side elevation view of the embodiment of FIG. 39.

DETAILED DESCRIPTION

Figure 1:
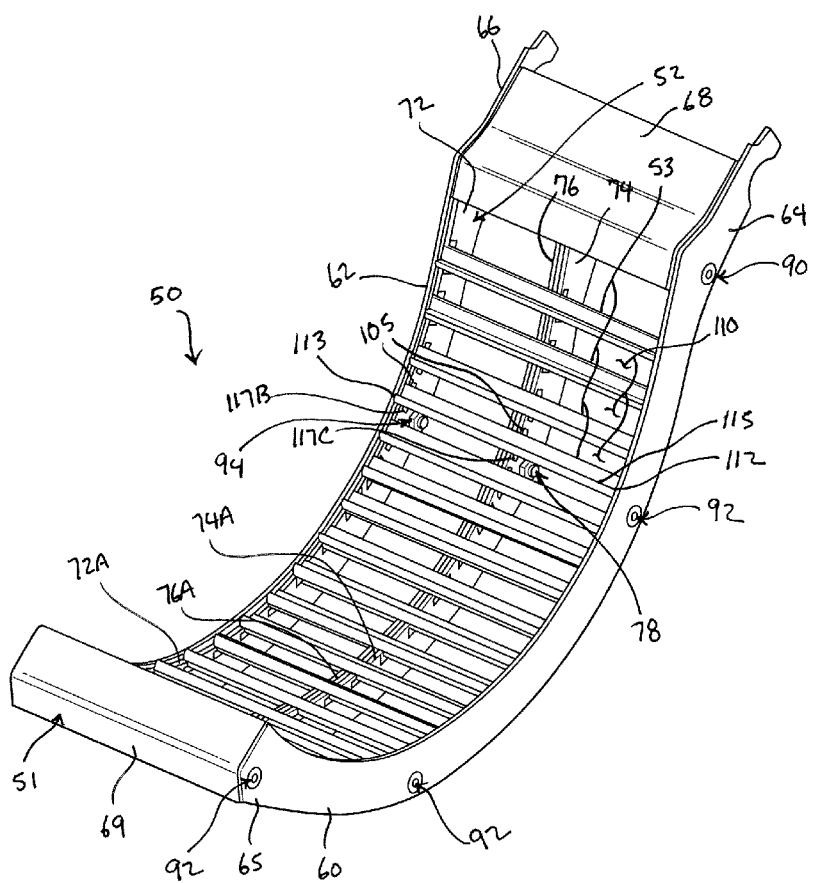
FIGS. 1-3 are perspective views of a concave constructed and arranged in accordance with the principle of the invention, the concave includes parallel bars carried by an inner frame connected to an outer frame.

A known agricultural combine includes a harvesting platform for harvesting a crop and directing it to a feederhouse. The harvested crop is applied from the feederhouse to a rotary crop processing unit that threshes and separates the harvested crop. The rotary crop processing unit includes a rotating threshing drum or rotor radially surrounded by a casing that together define an inlet section, a threshing section, and a separating section. The rotor is a hollow cylindrical drum having a numerous crop processing elements that engage the harvested crop and rotate it in the casing. The bottom of the casing has a concave under the threshing section and a separating grate under the separating section. Grain and chaff falling through the concave and the separating grate are directed to a cleaning system, which removes the chaff and directs the clean grain to a clean grain elevator that conveys the clean grain to a grain or bulk tank. The clean grain in the bulk tank is periodically unloaded into a grain cart or truck by an unloading auger, and the threshed and separated chaff is discharged from the combine through an outlet at the rear of the combine. The customary discharge beater at the rear of the combine propels the discharged chaff onto the field. The operation of the combine is controlled from an operator's cab.

The present invention is directed to the concave located under the threshing section of the rotary processing unit. One concave can be used, or a plurality of concaves can be assembled to form a concave assembly. A concave 50 constructed and arranged in accordance with the principle of the invention is shown in FIGS. 1-8. Concave 50 incorporates numerous hardware fasteners in the form of conventional nut-and-bolt assemblies. Each nut-and-bolt assembly in concave 50 includes the customary bolt and the customary corresponding nut. The bolt is inserted through corresponding openings in the pieces to be connected, the nut is threaded onto the threaded shank of the bolt, and the nut is tightened via rotation so as to secure the connected pieces between the head of the bolt and the nut threaded onto the threaded shank of the bolt. This operation is reversed to detach the connected pieces. This is a normal and customary nut-and-bolt fastening assembly. For clarity, different reference numerals are used to call out the various nut-and-bolt assemblies of concave 50.

Referencing FIGS. 1-8 in relevant part, concave 50 includes frame 51, frame 52, and threshing elements or bars 53. Bars 53 carried by frame 52 provide aggressive threshing edges. Bars 53 are independently removably connected to frame 52 so as to be selectively and independently attached to or otherwise installed on frame 52 in preparation for threshing and detached or otherwise released from frame 52 for individual bar 53 repair or replacement. Frames 51 and 52 cooperate to form a frame assembly, and are connected together for movement between a nested or closed position in FIGS. 1-3 so as to define the nested or closed position of the frame assembly and also concave 50, and an open position in FIGS. 4, 5, and 7 so as to define the open position of the frame assembly and also concave 50. In the closed position as in FIGS. 1-3, there is an interaction between frame 51 and bars 53 removably connected to frame 52, which holds and locks or otherwise secures bars 53 in place to the frame assembly in preparation for threshing. In the open position as in FIGS. 4, 5, and 7, frames 51 and 52 are spread apart, such that bars 53 are free from the influence of frame 51 so as to allow bars 53 to be readily, independently, and selectively removed, detached, or otherwise de-united from frame 52, and readily, independently, and selectively attached, installed, or otherwise united to frame 52, such as for bar repair or bar replacement purposes. Frame 51 is an outer frame, and frame 52 is an inner frame in that frame 52 is positioned within frame 51 in the nested or closed position of concave 50. Frames 51 and 52, and bars 53 are made of the customary steel as is normal in the art of concaves.

Referencing in relevant part FIGS. 1-5, FIG. 7, and FIG. 8, frame 51 includes members 60 and 62. Members 60 and 62 are end members and are substantially identical and coextensive. Members 60 and 62 are thin and elongate and are axially spaced from one another and extend parallel to one another, and are curved to extend circumferentially about a portion of the rotor of the rotary processing unit. Given that members 60 and 62 are end members and are curved, they may be referred to as either curved members, or curved end members. Curved end member 60 has opposite ends 64 and 65, and curved end member 62 has opposite ends 66 and 67. Transverse support member 68 extends between and is joined to ends 64 and 66 of curved members 60 and 62 via welding, and transverse support member 69 extends between and is joined to ends 65 and 67 of curved end members 60 and 62 via welding. Transverse support members 68 and 69 are relatively thin, elongate plates.

Frame 52 includes members 70, 72, 74, and 76. Members 70, 72, 74, and 76 are substantially identical and coextensive. Members 70 and 72 are thin and elongate and are axially spaced from one another, and members 74 and 76 are thin and elongate and are axially juxtaposed relative to each other and axially spaced from members 70 and 72. Members 70, 72, 74, and 76 extend parallel relative to each other, and relative to members 60 and 62. Members 70 and 72 are the outermost or end members of frame 52, and members 74 and 76 are between members 70 and 72 and are the innermost or intermediate members of frame 52. Members 74 and 76 are substantially equidistant between members 70 and 72, and extend parallel to one another. Member 74 is axially positioned alongside member 76 and is between member 76 and member 70. Member 76 is axially positioned alongside member 74 and is between member 74 and member 72. Members 74 and 76 are releasably connected to each other with fasteners, here in the form of two nut-and-bolt assemblies 78, which are longitudinally spaced apart between, on the one hand, ends 84 and 86, and, on the other hand, ends 85 and 87. Less or more such assemblies 78 can be used. Members 70, 72, 74 and 76 are curved like that of end members 60 and 62 to similarly extend circumferentially about a portion of the rotor of the rotary processing unit. Members 60, 62, 70, 72, 74, and 76 have matching curvatures. Given that members 70 and 72 are end members and are curved, they may be referred to as either curved members, or curved end members. Given that members 74 and 76 are intermediate members and are curved, they may be referred to as either curved members, or curved intermediate members. Curved end member 70 has opposed ends 80 and 81, curved end member 72 has opposed ends 82 and 83, curved intermediate member 74 has opposed ends 84 and 85, and curved intermediate member 76 has opposed ends 86 and 87.

Figure 2:
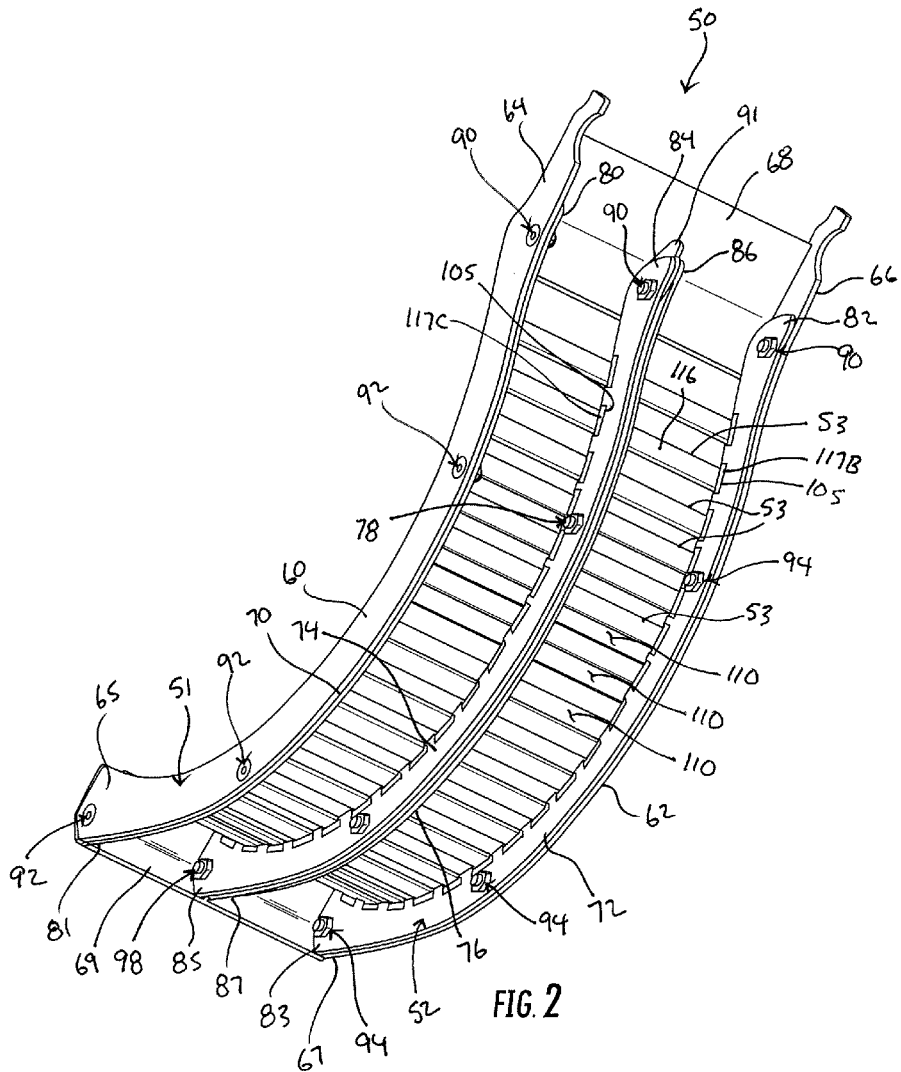
Figure 3:
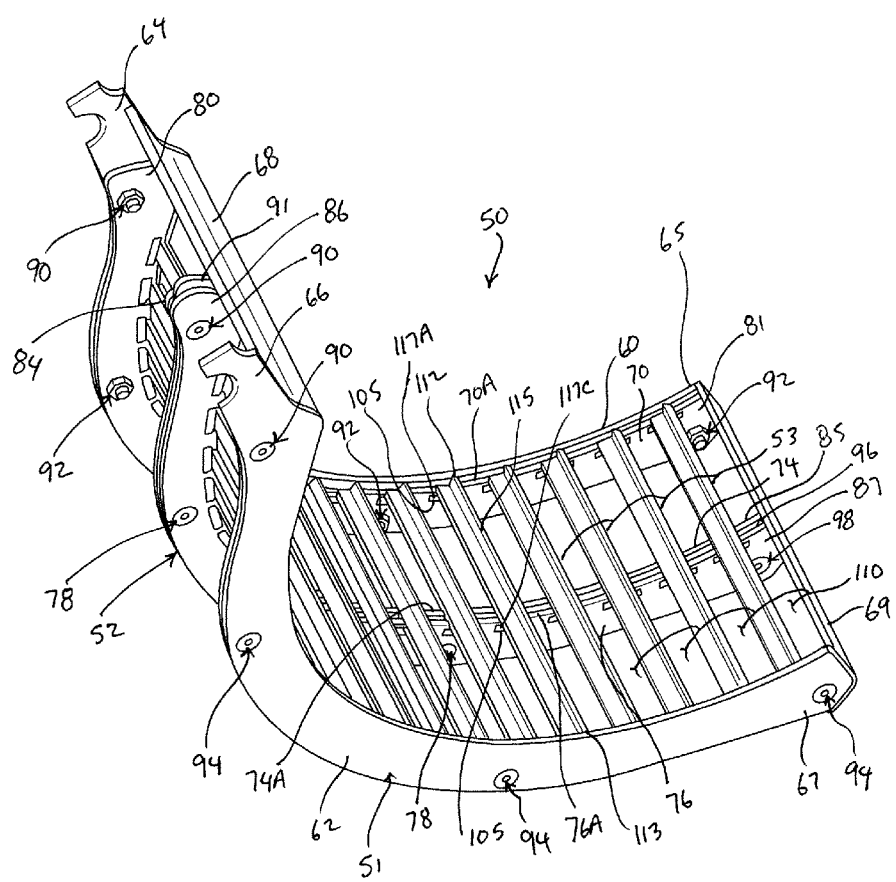
Figure 4:
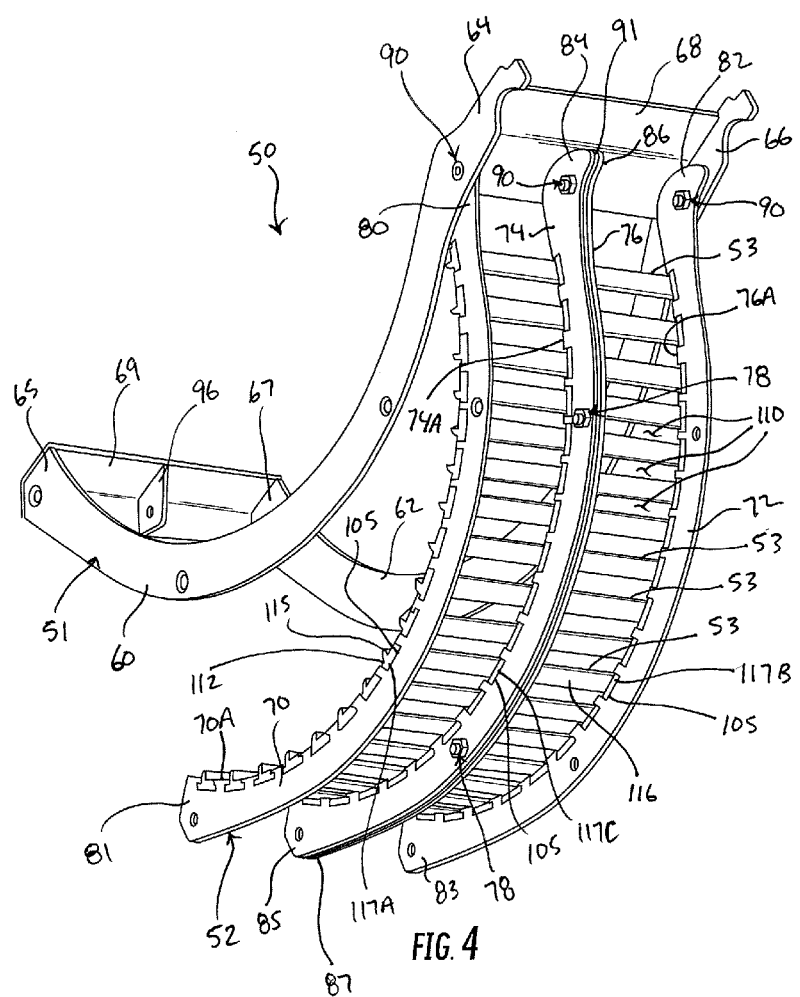
FIG. 4 is a perspective view of the embodiment of FIGS. 1-3 shown as it would appear open.
Figure 5:
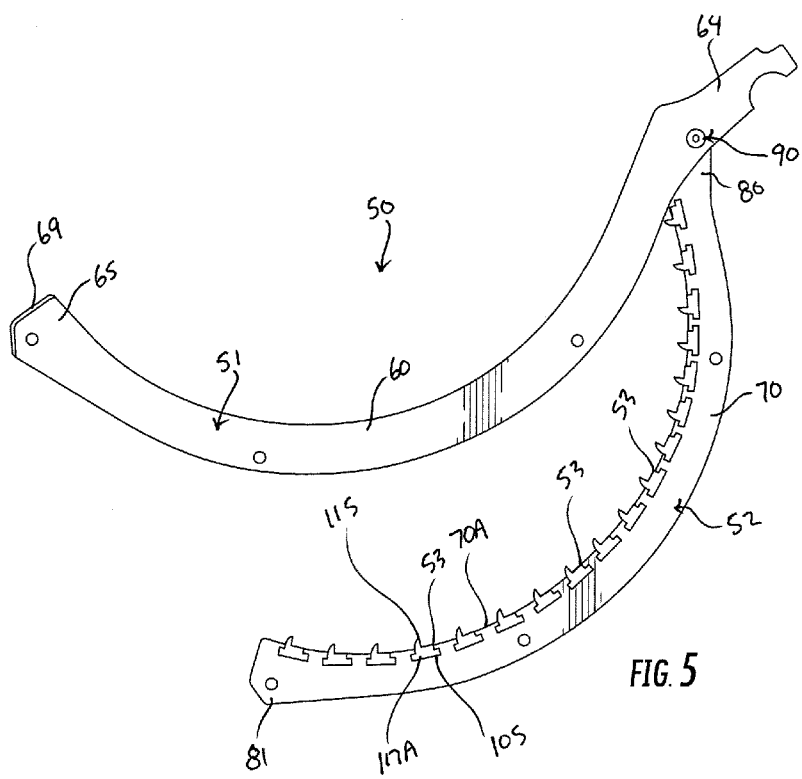
FIG. 5 is a side elevation view of the embodiment of FIG. 4.

Frames 51 and 52 are connected together so as to be movable between the nested or closed position in FIGS. 1-3 in the assembly of concave 50 in preparation for threshing in which frames 51 and 52 are axially aligned, and the open position in FIGS. 4, 5, and 7 in which frames 51 and 52 are spread apart like co-acting jaws for bar 53 maintenance and replacement purposes. Curved end member 70 is juxtaposed along, and is in direct contact against, the inner side of curved end member 60, and curved end member 72 is juxtaposed along, and is in direct contact against, the inner side of curved end member 62. End 80 of curved end member 70 is connected to end 64 of curved end member 60, end 82 of curved end member 72 is connected to end 66 of curved end member 72, and ends 84 and 86 of curved intermediate members 74 and 76 are connected to transverse support member 68 at an intermediate location between end 80 of curved end member 70 connected to end 64 of curved end member 60, and end 82 of curved end member 72 connected to end 66 of curved end member 62. The connections of ends 80, 82, 84, and 86 of frame 52 to frame 51 are pivotal connections, here via nut-and-bolt fasteners 90, that provide concurrent pivotal movement of members 70, 72, 74, and 76 that make up frame 52 between a first position downwardly and away from frame 51 as in FIGS. 4, 5, and 7 so as to define the open position of frame 52 and, moreover, the open position of the frame assembly and of concave 50, and a second position upwardly toward frame 52 as in FIGS. 1-3 so as to define the nested or closed position of frame 52 and, moreover, the nested or closed position of the frame assembly and of concave 50. Ends 64 and 80 are pivotally connected with one nut-and-bolt fastener 90, ends 82 and 66 are pivotally connected with one nut-and-bolt fastener 90, and ends 84 and 86 are pivotally connected to transverse support member 68 with one nut-and-bolt fastener 90. As seen in FIGS. 2 and 3, transverse support member 68 has an intermediate lug 91 formed on its under or inner side. Lug 91 is equidistant between ends 64 and 66 of curved end members 60 and 62. Lug 91 extends between ends 84 and 86 of curved intermediate members 74 and 76, and one nut-and-bolt assembly 90 pivotally connects lug 91 to ends 84 and 86 on either side of lug 91. Pivot pins or other forms of pivotal connections or fasteners can be used to pivotally connect ends 80, 82, 83, and 84 of frame 52 to described connecting points of frame 51 without departing from the invention.

And so ends 80, 82, 84, and 86 of frame 52 are mounted to frame 51 for pivotal movement, here via nut-and-bolt fasteners 90, for movement between the first or open position of frame 52 extending downwardly and away from frame 51 as in FIGS. 4, 5, and 7 so as to define the open position of the frame assembly and of concave 50, and the second or nested or closed position of frame 52 upwardly toward and within frame 51 as in FIGS. 1-3 so as to define the nested or closed position of the frame assembly and of concave 50. In the nested or closed position with reference in relevant part to FIGS. 1-3 and 8, frame 52 is within frame 51, curved end member 70 extends parallel to and is axially juxtaposed along and is in direct contact with the inner side of curved end member 60 that in turn extends parallel to and is axially juxtaposed along the outer side of curved end member 60, curved end member 72 extends parallel to and is axially juxtaposed along and is in direct contact with the inner side of curved end member 62 that in turn extends parallel to and is axially juxtaposed along the outer side of curved end member 62, and parallel and axially juxtaposed curved intermediate members 74 and 76 extend parallel relative to curved end members 60, 62, 70 and 72 and are equidistant between and are axially spaced from curved end members 70 and 72 extending parallel along the inner sides of the respective curved end members 60 and 62. Curved end member 70 extends concurrently along the length of curved end member 60 of frame 51 from end 80 connected to end 64, to end 81 at end 65 at the inner side of transverse support member 69. Curved end member 72 extends concurrently along the length of curved end member 62 of frame 51 from end 82 connected to end 66, to end 83 at end 67 at the inner side of transverse support member 69. Curved intermediate members 74 and 76 extend concurrently along the length of frame 51 from ends 84 and 86 connected to transverse support member 68 to ends 85 and 87 at the inner side of transverse support member 69.

Fasteners are used to removably connect frame 52 to frame 51 in the second or closed position of frame 52 defining the nested or closed position of frames 51 and 52 so as to secure concave 50 in the nested or closed position in preparation for threshing. Specifically, end members 60 and 70 are releasably connected to each other with longitudinally spaced fasteners, here in the form of three nut-and-bolt assemblies 92 and less or more of such assemblies 92 can be used, and end members 62 and 72 are releasably connected to each other with longitudinally spaced fasteners, here in the form of three nut-and-bolt assemblies 94 and less or more of such assemblies 84 can be used. As seen in FIGS. 4 and 7, transverse support member 69 has an intermediate lug 96 formed on its inner side equidistant between ends 64 and 66 of curved end members 60 and 62. In the second position of frame 52 defining the nested or closed position of frames 51 and 52, lug 91 is applied between ends 85 and 87 of curved intermediate members 74 and 76 as shown in FIG. 3, and one fastener, here in the form of one nut-and-bolt assembly 98, releasably connects lug 96 to ends 85 and 87 on either side of lug 96, and this further secures concave 50 in its nested or closed position.

In FIGS. 1-5, 7, and 8, frame 52 carries bars 53. Bars 53 are identical and are spaced from one another and are parallel relative to each other and extend axially between curved end members 70 and 72, and across curved intermediate members 74 and 76, forming openings 110 therebetween for grain to pass through, as shown in FIGS. 1-4.

Referencing the bar 53 in FIG. 7 shown removed from frame 52 of concave 50, each bar 53 is elongate and longitudinally straight and integrally formed via machining or molding and has opposed ends 112 and 113, an upper aggressive threshing edge 115 that extends between ends 112 and 113 and a lower end 116 that extends between ends 112 and 113. Bars 53 are each independently removably connected to frame 52 via an engagement assembly. Each engagement assembly for removably connecting each of the bars 53 to frame 52 includes elements thereof carried by each of the bars 53 and complemental elements thereof carried by frame 52, specifically members 70, 72, 74, and 76. The element and the complemental element of each engagement assembly are a tongue 117 and a slot 105, respectively. Tongue 117, which is exemplary of a male engagement element, and slot 105, which is exemplary of a female engagement element, have conforming or complementing shapes that allow them to interlock. Although the element of each engagement assembly is tongue 117 and the complemental element of each engagement assembly is slot 105, this arrangement can be reversed.

Figure 6:
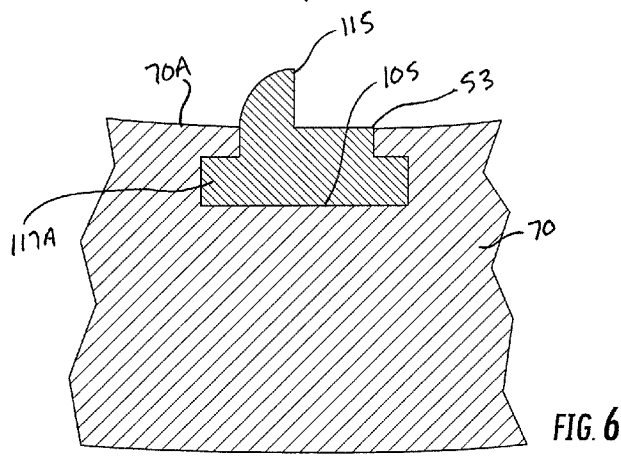
FIG. 6 is a transverse section view illustrating an engagement assembly between a bar and a curved member of the concave of FIGS. 1-5.

Referencing FIGS. 1-5 and 7 in relevant part, members 70, 72, 74, and 76 have top edges 70A, 72A that lie along a common curved surface to extend circumferentially about a portion of the rotor of a rotary processing unit. Members 70, 72, 74, and 76 each have slots 105. Slots 105 are identical and are identically longitudinally spaced along the lengths of the respective members 70, 72, 74, and 76. Slots 105 are formed in top edges 70A, 72A, 74A, and 76A of the respective members 70, 72, 74, and 76. FIG. 6 shows one such slot 105 in top edge 70A of member 70. Slots 105 in top edge 70A of member 70 are axially aligned or otherwise correspond with the slots 105 in top edges 72A, 74A, and 76A of the other members 72, 74, and 76. The slots 105 of each set of axially aligned slots 105 of members 70, 72, 74, and 76 form the complemental elements of an engagement assembly that relate to the elements of the engagement assembly of each corresponding bar 53.

Each bar 53 has three axially spaced tongues 117 formed in lower end 116, including end tongue 117A near end 112, end tongue 117B near end 113, and intermediate tongue 117C equidistant between end tongues 117A and 117B. The tongues 117A, 117B, and 117C of each bar 53 form the elements of the engagement assembly that relate to the complemental elements of the engagement assembly defined by the slots 105 of each set of axially aligned slots 105 of members 70, 72, 74, and 76. Tongues 117A, 117B, and 117C of each bar 53 are seated in a set of axially aligned slots 105 of the corresponding members 70, 72, 74, and 76. Tongues 117A are seated in slots 105 of curved end member 70, tongues 117B are seated in corresponding slots 105 of curved end member 72, and tongues 117C are seated the corresponding slots 105 of curved intermediate members 74 and 76. In this embodiment, slots 105 and tongues 117A, 117B, and 117C of the engagement assemblies have corresponding T-shapes, which secure bars 52 prevent axial rotation of the bars 53 relative to frame 52, permit movement of bars 53 along only one axis, which is the longitudinal axis of each bar 53, and restrict movement of each bar 53 in any other axis or direction, including axes/directions that are transverse or perpendicular relative to the curvature of frame 52. FIG. 6 shows one tongue 117A of one bar 53 seated in one slot 105 in top edge 70A of member 70.

The bars 53, including at their opposite ends 112 and 113, are not affixed so as to be immovable using any suitable technique, such as by welding, to members 70, 72, 74, after uniting the elements and the complemental elements of each engagement assembly removably connecting each bar 53 to frame 52. Because of this, bars 53 are left removably connected to frame 52 simply by seating/inserting the tongues 117 of each bar into a corresponding set of axially aligned slots 105 in members 70, 72, 74, and 76, and readily removed from frame 52 by releasing the tongues 117 of each bar 53 from the corresponding set of axially aligned slots 105 in members 70, 72, 74, and 76.

Installation of each bar 53 is carried out simply by axially aligning its tongues 117 with a preselected set of axially aligned slots of members 70, 72, 74, and 76, and then moving the bar 53 axially along its longitudinal axis so as to concurrently slide tongue 117A into the preselected slot 105 of member 70, tongue 117B into the corresponding slot 105 of member 72, and tongue 117C concurrently into the corresponding slots 105 of members 74 and 75. The removal of each bar 53 is done simply by reversing this operation. This way, the bars 53 may be readily attached or united to frame 52 and detached or de-united from frame 52 as desired, such as for repair or replacement in the case of bar 53 wear or damage. And when bars 53 are so removably connected to frame 52, the tongues 117 of the bars 53 are seated in the shape-conforming slots 105 formed in members 70, 72, 74, and 76 at their respective top edges 70A, 72A, 74A, and 76A, and the threshing edges 115 extend above top edges 70A, 72A, 74A and 76A of the respective members 70, 72, 74, and 76 of frame 52 so as to be located for threshing a harvested crop. FIG. 6 not only shows one tongue 117A of one bar 53 seated in one slot 105 in top edge 70A of member 70, but also shows one threshing edge 115 extending above top edge 70A.

As described above, the bars 53 are not affixed to frame 52 using any suitable technique, such as by welding, to members 70, 72, 74, and 76 so as to be permanently connected to frame 52, such that the only way to remove them would be to destroy such a permanent connection. The described engagement assembly between each bar 53 and frame 52 is a non-destructive, removable and impermanent connection, which means that the connection between the various tongues and slots does not require the destruction of the engagement assembly, such as by cutting, in order to remove the various bars 53 from frame 52.

To removably install bars 53 on frame 52 in an example, frame 52 is located in the open position as in FIGS. 4, 5, and 7, and each bar 53 is removably connected to frame 52 by axially aligning its tongues 117 with a preselected set of axially aligned slots 105 of members 70, 72, 74, and 76, and then simply moving the bar 53 axially along its longitudinal axis so as to concurrently slide tongue 117A into the preselected slot 105 of member 70, tongue 117B into the corresponding slot 105 of member 72, and tongue 117C into the corresponding slots 105 of members 74 and 75. In FIG. 7 one bar 53 is shown positioned upright from lower end 116 to upper threshing edge 115 with its tongues axially aligned with a set of axially aligned slots 105 in preparation for installation on frame 52, which is carried out simply by moving bar 53 axially along its longitudinal axis in the direction of arrowed line A, whereby tongue 117B is passed sequentially through a slot 105 of member 70 and then through axially aligned slots 105 of members 74 and 76 to its final resting place in axially aligned slot 105 of member 72. As the bar 53 is so moved in the direction of arrowed line A, tongue 117C follows tongue 117B and passes first through slot 105 of member 70 to its final resting place in axially aligned slots 105 of members 74 and 76, and tongue 117A follows tongue 117C to its final resting place in the slot 105 of member 70. The removal of such bar 53 from frame 52 is done by reversing this operation simply by moving such bar axially along its longitudinal axis in the direction of arrowed B opposite to that of the direction of arrowed line A. The remaining bars 53 in FIG. 7 are installed in the same way and are shown so installed on frame 52, whereby each installed bar 53 extends axially from end 112 of bar 53 at member 70 and across members 74 and 76 to end 113 of bar 53 at member 72, which is also illustrated in FIG. 8. With further reference to FIG. 8, end 112 of each installed bar 53 is substantially flush with respect to the outer side of member 70, the opposed end 113 of each installed bar 53 is identically substantially flush with respect to the outer side of member 72, and the threshing edge 115 of each installed bar 53 extends above top edges 70A, 72A, 74A and 76A of the respective members 70, 72, 74, and 76 of frame 52 so as to be located for threshing a harvested crop. Openings 110 are formed between the installed bars 53 for grain to pass through. To removably install a bar 53 on frame 52 in another embodiment, the bar 53 can be simply positioned over frame 52 so as to axially align tongue 117A on one side of one slot 105 in member 70, axially align tongue 117B on one side of a corresponding slot 105 in member 72, and axially align tongue 117C on one side of corresponding slots 105 in members 74 and 76, and then the bar 53 can be moved in one direction along its longitudinal axis toward the respective slots 105 to concurrently insert the tongues 117 into the corresponding slots 105 to install the bar 53 on frame 52, and in the opposite direction to remove tongues 117 from the respective slots 105 to detach the bar 53 from frame 52.

In the open position of concave 50 shown in FIGS. 4 5 and 7, frame 52 is pivoted away from frame 51 so as to extend downwardly and away from frame 52 from ends 80, 82, 84 and 86 connected to frame 52 to ends 81, 83, 85, and 87, which allows the selective installation and removal of bars 53 with respect to frame 52 without interference from frame 51. In other words, in the open position of concave 50, frame 51 is pivoted away from bars 53 on frame 52 to allow movement of bars 53 between their installed and released positions relative to frame 52. Once all of the bars 53 are installed on frame 52 as in FIGS. 4 and 5, completion of the assembly of concave 50 in preparation for threshing is done by securing concave 50 into its nested or closed position by pivoting frame 52 upwardly in the direction of arrowed line C from its open position in FIGS. 4 and 5 to its nested or closed position in FIGS. 1-3 nested in frame 51, and then securing members 60 and 70 with nut-and-bolt assemblies 92, securing members 62 and 72 with nut-and-bolt assemblies 94, and securing members 74 and 76 to lug 91 with nut-and-bolt assembly 98.

In the nested or closed position of frame 52 defining the closed position of concave 50 shown in relevant part in FIGS. 1-3 and 8, frame 51 interacts with bars 53 to restrict or otherwise restrain each of the bars 53 from moving between installed and released positions so as to secure and hold/lock bars 53 in place to frame 52 and, thus, to the frame assembly. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 53 on one side of concave 50, and curved end member 62 of frame 51 that extends parallel to and is axially juxtaposed along the outer side of curved end member 72 of frame 52 closely confronts and makes direct contact against the opposed ends 113 of bars 53 on the opposed side of concave assembly 50, whereby curved end members 60 and 62 thusly act as curved stops axially spaced from one another and juxtaposed on either side of the respective curved end members 70 and 72 of frame 52 and the respective ends 112 and 113 of the respective bars 53 functioning to capture bars 53 therebetween to restrict movement of bars 53 between their installed and released positions, and which also prevents the ability to install a bar 53 on frame 53 should one be inadvertently missing.

With concave 50 so assembled, concave 50 is ready for threshing in the customary manner in a rotary processing unit. In the rotary processing unit, bars 53 extend parallel to the axis of rotation of the rotating threshing drum, and upper threshing edges 115 extend upward from top edges 70A, 70B, 70C, and 70D of members 70, 72, 74, and 76 of frame 52 to provide aggressive threshing of the harvested crop and openings 110 between bars 53 are for grain to pass through. In a rotary combine, a single long concave 50 can be utilized as the concave or multiple shorter concaves 50 can be arranged end-to-end to form the concave. Should bars 53 become worn or damaged so as to require replacement or repair, nut-and-bolt fasteners 92, 94, and 98 are simply removed to release frame 52 from frame 51, and frame 52 is pivotally moved downwardly in the direction of arrowed line D in FIGS. 1-3 from the nested or closed position of frame 52 defining the closed position of the frame assembly and of concave 50 to the open position of frame 52 in FIGS. 4, 5, and 7 defining the open position of the frame assembly and of concave 50 to allow any of the bars needing replacement or repair to be easily removed, repaired or replaced, and reinstalled, in accordance with the principle of the invention. FIGS. 4 and 5 show frames 51 and 52 in the open position with the nut-and-bolt assemblies 92, 94, and 98, shown in FIG. 2, removed. After selected bars 53 are quickly repaired or replaced and installed on frame 52, frame 52 may then be moved upwardly in the direction of arrowed line C in FIGS. 4 and 5 from its open position in FIGS. 4 and 5 to its closed position in FIGS. 1-3, and then secured in place with nut-and-bolt assemblies 92, 94, and 98 so as to secure concave 50 in the nested or closed position in preparation for the resumption of threshing in the normal manner.

In the embodiment denoted at 50, bars 53 extending between curved end members 70 and 72 and across curved intermediate members are single bars 53. As such, in concave 50 frame 52 has parallel single bars 53. In an alternate embodiment of a concave constructed and arranged in accordance with the principle of the invention, frame 52 can be formed with parallel rows of split bars. Such a concave 130 is discussed in conjunction with FIGS. 9-12.

Concave 130 is identical in every respect to concave 50 in that it shares frame 51 and frame 52 and all associated nut-and-bolt assemblies. In this example, the bars, which are identical and are each denoted at 131, are each identical to bars 53 in that they share ends 112 and 113, upper threshing edge 115, lower end 116, and tongues 117. Bars 131 are each independently removably connected to frame 52 via the engagement assembly. Each engagement assembly for removably connecting each of the bars 53 to frame 52 includes elements thereof carried by each of the bars 53, namely, tongues 117, and complemental elements thereof carried by frame 52, namely, slots 105 in members 70, 72, 74, and 76. Again, the positioning of tongues 117 and slots 105 can be reversed.

Figure 9:
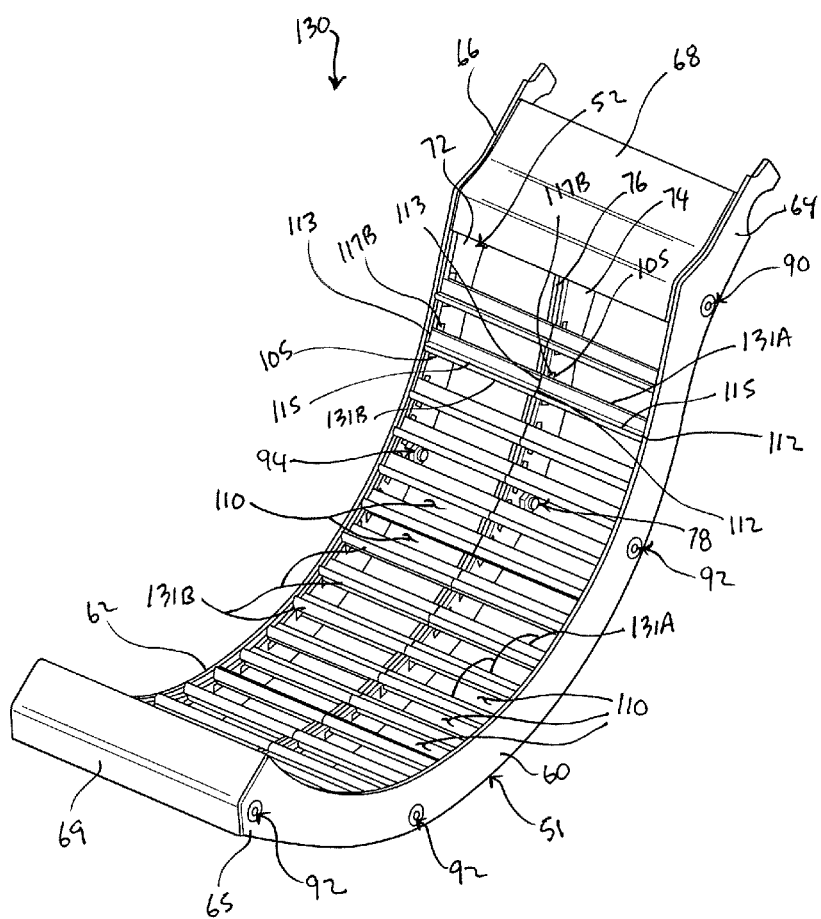
FIG. 9 is a perspective view of a concave constructed and arranged in accordance with an alternate embodiment of the invention, the concave includes parallel rows of bars carried by an inner frame connected to an outer frame.
Figure 10:
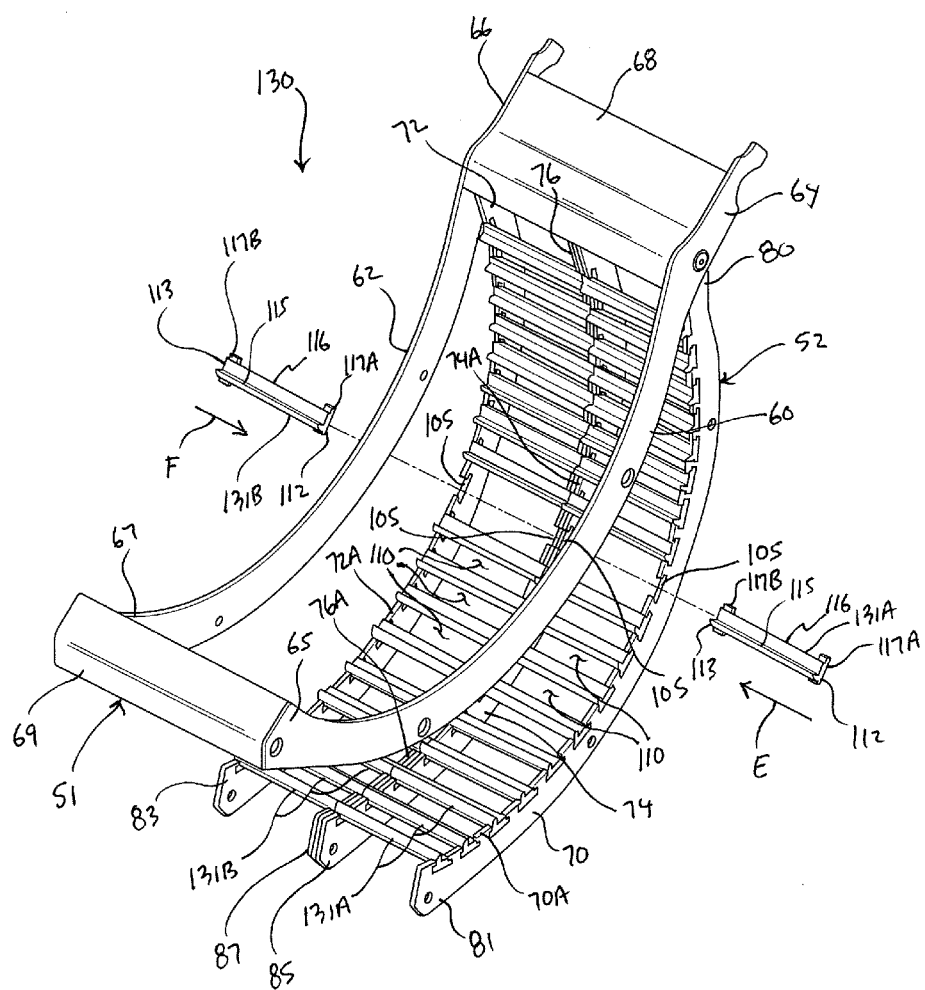
FIG. 10 is a perspective view of the embodiment of FIG. 9 shown as it would appear open with a pair of opposed bars removed from the inner frame of the concave.

In concave 130 bars 131 are half the length of bars 53 and include just two tongues 117, namely, tongue 117A near end 112 and tongue 117B near end 113. In this example, there are two axially aligned bars 131 for each row of bars 131, and rows of bars 131, of course, form openings 110 therebetween for grain to pass through as in concave 50. Two bars 131 are axially aligned for each row. One bar 131A extends axially from member 70 to member 74, and the other bar 131B extends axially from member 76 to member 72. Specifically, one bar 131A extends axially from end 112 thereof at member 70 to end 113 thereof at member 74, and the corresponding tongues 117A and 117B are applied to axially aligned slots 105 in members 70 and 74 respectively. The other bar 131B extends axially from end 113 thereof at member 72 to end 112 thereof at member 76, and the corresponding tongues 117B and 117A are applied to axially aligned slots 105 in members 72 and 76 respectively. Each pair of bars 131A and 131B are axially aligned, and the end 113 of bar 131A extending between members 70 and 74 confronts and diametrically opposes the end 112 of bar 131B extending between members 72 and 76. FIG. 9 shows concave 130 as it would appear closed with parallel rows of two bars 131A and 131B each. FIG. 10 shows concave 130 as it would appear open to allow independent installation and removal of the various bars 131, and two corresponding bars 131A and 131B to make a row of two bars are shown detached from frame 52 in preparation for installation into the corresponding available set of axially aligned slots 105. To install these detached bars 131 into the axially aligned set of slots 105 in members 70, 72, 74, and 76, one bar 131A is positioned to axially align tongues 117A and 117B with axially aligned slots 105 in members 70 and 74, and bar 131A is then moved axially along its longitudinal axis in the direction of arrowed line E to set tongues 117A and 117B into slots 105 of the respective members 70 and 74. To detach bar 131A from frame 52, this operation need only be reversed. The other bar 131B is, in turn, positioned to axially align tongues 117A and 117B with axially aligned slots 105 in members 72 and 76, and bar 131B is then moved axially along its longitudinal axis in the direction of arrowed line F to set tongues 117A and 117B into slots 105 of the respective members 76 and 72. To detach bar 131B from frame 52, this operation need only be reversed. After bars 131A and 131B of each parallel row of bars 131A and 131B are so removably installed on frame 52, frames 51 and 52 may be adjusted via pivoting from the open position in FIG. 10 to the closed position in FIG. 9, and then secured with the corresponding nut-and-bolt fasteners in the closed position so as to ready concave 130 for threshing.

Figure 11:
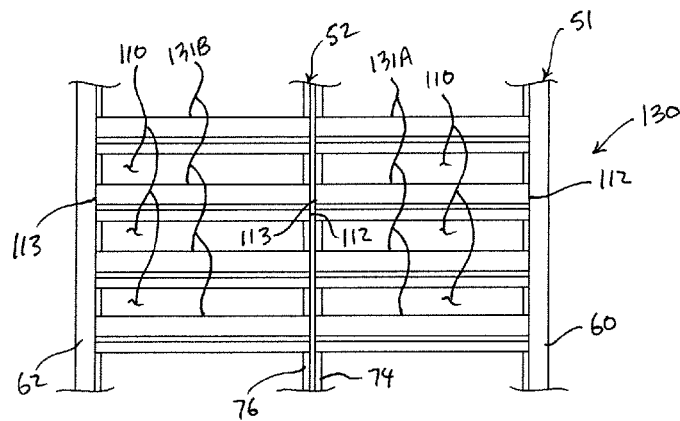
FIG. 11 is a top plan view of a section of the embodiment of FIG. 9 illustrating the outer frame capturing rows of bars carried by the inner frame.
Figure 12:
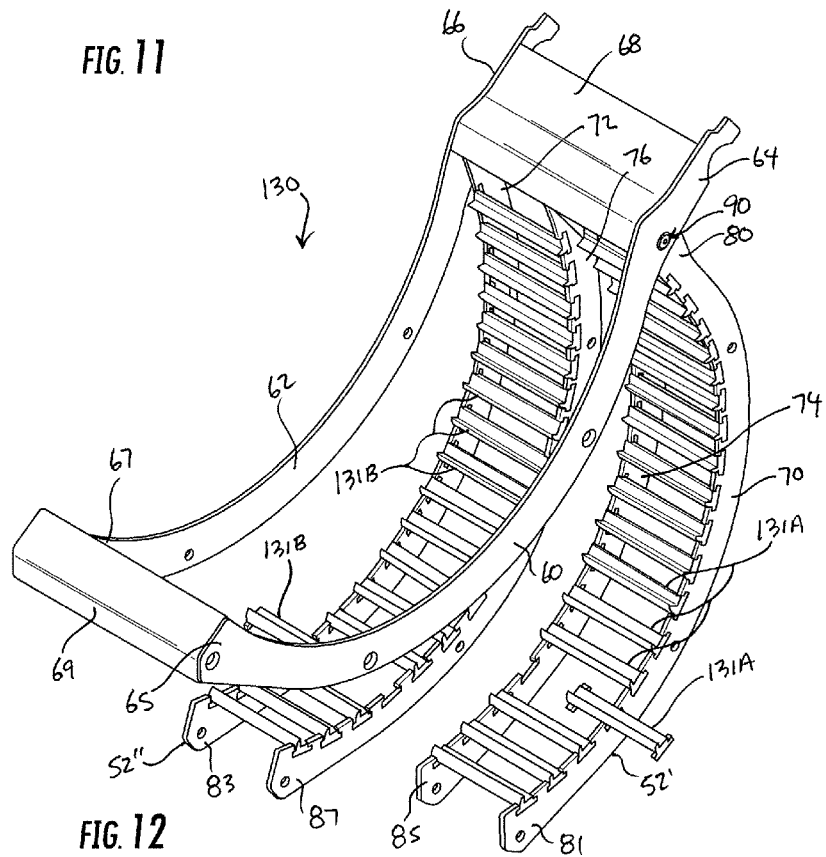
FIG. 12 is a perspective view of an alternate configuration of the embodiment of FIG. 10.

In the nested or closed position of frame 52 defining the closed position of concave 130 in FIGS. 9 and 11, frame 51 restricts or otherwise restrains the rows of bars 131 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 112 of bars 131A extending between member 70 and member 74, and curved end member 62 of frame 51 that extends parallel to and is axially juxtaposed along the outer side of curved end member 72 of frame 52 closely confronts and makes direct contact against ends 113 of bars 131B extending between members 72 and 76, whereby curved end members 60 and 62 act as curved stops axially spaced from one another and juxtaposed on either side of the respective curved end members 70 and 72 of frame 52 and the respective ends 112 and 113 of the respective bars 131A and 131B capturing each row of bars 131A and 131B therebetween to restrict movement of bars 131 between their installed and released positions, and which also prevents the ability to install one or more bars 131 on frame 53 should one or more be inadvertently missing.

In concave 130, members 70 and 72 are considered one frame or otherwise a sub-frame 52' of frame 52, and members 72 and 76 are considered another frame or sub-frame 52" of frame 52. Frames 52' and 52" cooperate to form frame 52 and are, of course, connected together for movement of frame 52 between the closed position of the open and closed positions as herein specifically described. Again, as discussed in conjunction with concave 50, should bars 131 become worn or damaged so as to require replacement or repair, nut-and-bolt fasteners 92, 94, and 98, illustrated in FIG. 8, are simply removed to release frame 52 from frame 51, and frame 52 is pivotally moved downwardly to the open position as in FIG. 10. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 12 to the closed positions as in FIG. 9, at which point the various nut-and-bolt assemblies 92, 94, 78, and 98, depicted in FIG. 2, may be re-installed to secure concave 130 in the closed position in FIG. 9 in preparation for threshing. With this arrangement, nut-and-bolt assemblies 78, 92, and 98 may be removed to release frame 52' from frames 51 and 52" to allow independent pivotal movement of frame 52' from its closed position to its open position independently of frame 52" to allow a user to service bars 131 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow pivotal movement of frame 52" from its closed position to its open position independently of frame 52' to allow a user to service bars 131 of frame 52", after which frame 52" may be pivoted back to its closed position and secured via nut-and-bolt assemblies 78, 94, and 98 to frames 52' and 51.

Figure 13:
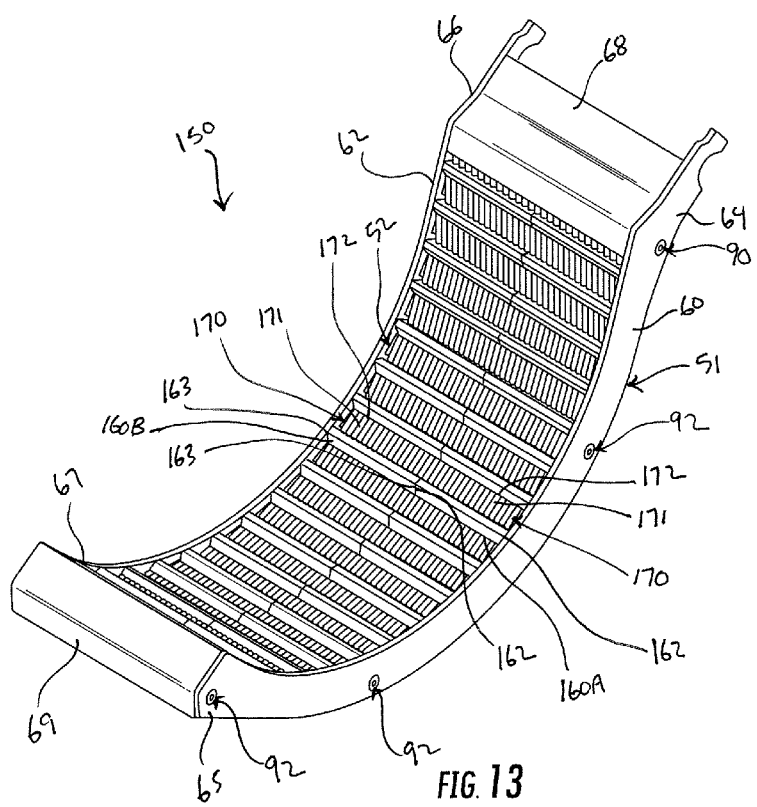
FIG. 13 is a perspective view of a concave constructed and arranged in accordance with an alternate embodiment of the invention, the concave includes parallel rows of bars carried by an inner frame connected to an outer frame, the bars each being formed with an integrated grate.
Figure 14:
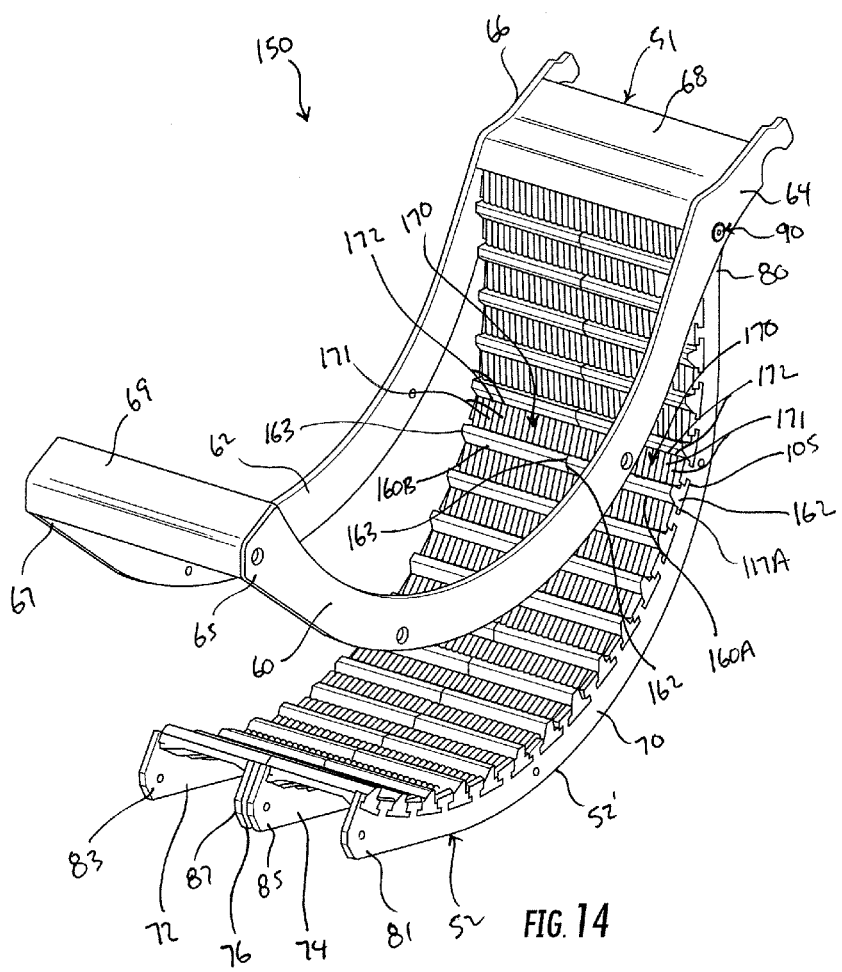
FIG. 14 is a perspective view of the embodiment of FIG. 13 shown as it would appear open.
Figure 15:
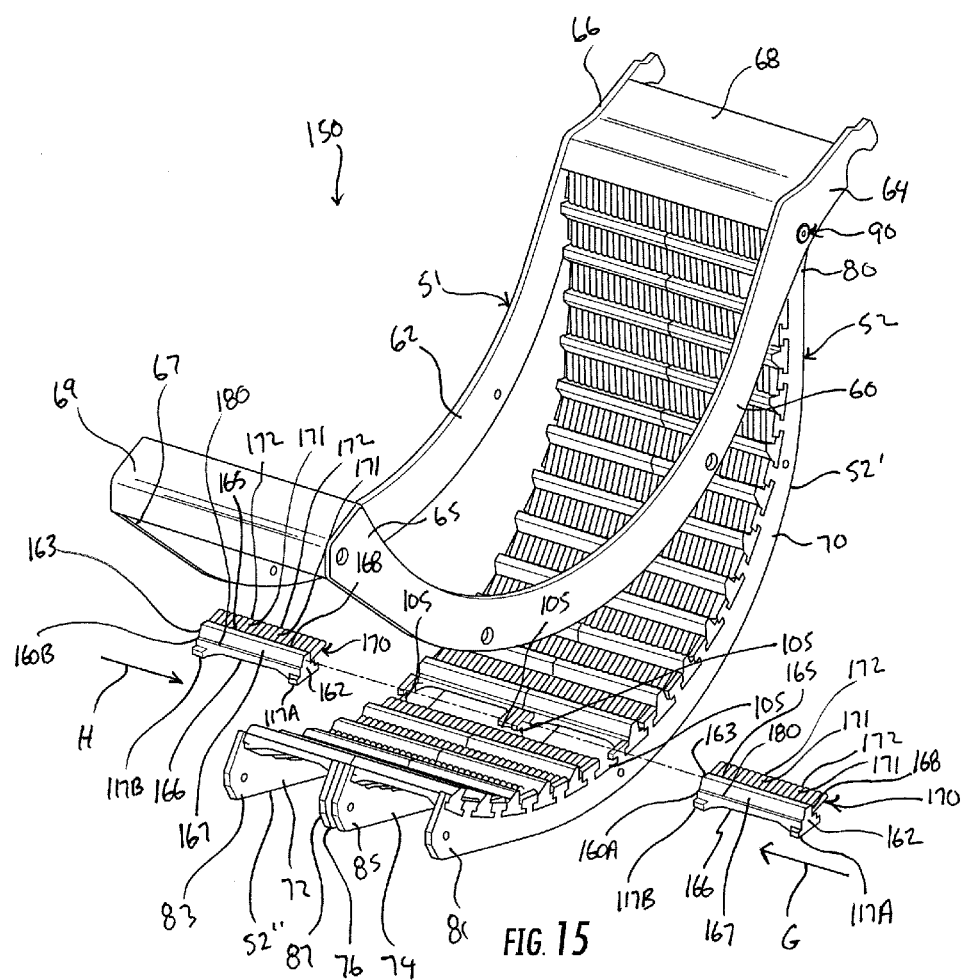
FIG. 15 is a view similar to that of FIG. 14 illustrating a pair of opposed bars removed from the inner frame of the concave.
Figure 16:
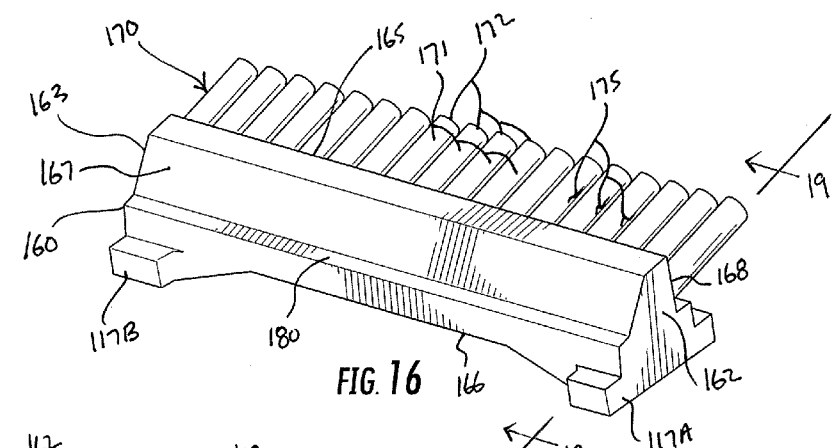
FIG. 16 is a rear perspective view of a bar of the concave depicted in FIGS. 13-15.
Figure 17:
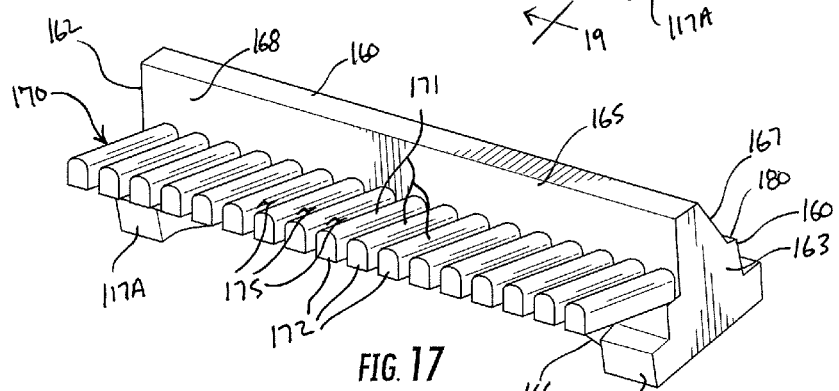
FIG. 17 is a front perspective view of the embodiment of FIG. 16.
Figure 18:
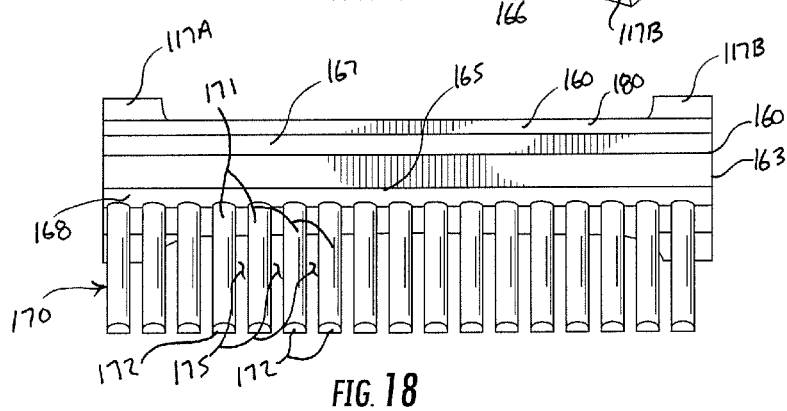
FIG. 18 is a top plan view of the embodiment of FIG. 16.

Concave 130 is exemplary of a "split-bar" construction. Another "split-bar" concave 150 is shown in FIGS. 13-15.

Concave 150 is identical in every respect to concaves 50 and 130 in that it shares frame 51 and frame 52 and all associated nut-and-bolt assemblies. In this example, the bars, which are identical and are each denoted at 160, are half the length of bars 53 of concave 50 like that of bars 131 of concave 130. Referencing FIGS. 16-19, each bar 160 has a threshing component and a separating component. Each bar 160 is elongate and longitudinally straight and integrally formed via machining or molding and has opposed ends 162 and 163, an aggressive upper threshing edge 165 that extends between ends 162 and 163, a lower end 166 that extends between ends 162 and 163, a back 167 and an opposed front 168 that each extend between ends 162 and 163, a grate denoted generally at 170 formed in front 168, and a shoulder 180 formed in back 167. Upper threshing edge 165 is the threshing component of bar 160, and grate 170 is the separating component of bar 160. Grate 170 is formed in front 168 of bar 160 between upper threshing edge 165 and lower end 166, and extends along the length of bar 160 from end 162 to end 163. In this embodiment, grate 170 consists of identical and coextensive axially-aligned parallel fingers 171 that extend outwardly from front 168 to free ends 172. Fingers 171 are axially spaced forming openings 175 therebetween for grain to pass through. Fingers 171 are equally spaced apart and openings 175 are identically sized.

Shoulder 180 is formed in back 167 of bar 160 between upper threshing edge 165 and lower end 166, and extends along the length of bar 160 from end 162 to end 163.

Just like bars 131 of concave 130, bars 160 are each independently removably connected to frame 52 via the tongues 117 and slots 105 engagement assembly. Each engagement assembly for removably connecting each of the bars 160 to frame 52 includes the elements thereof in the form of tongues 117 carried by each of the bars 160 and the complemental elements thereof in the form of slots 105 carried by frame 52, specifically members 70, 72, 74, and 76. Like bars 131 of concave 130, bars 160 each have two tongues 117, namely, tongue 117A near end 162 and tongue 117B near end 163.

In this example with reference to FIGS. 13-15, there are two axially aligned bars 160 for each row of bars 160, and rows of bars 160, of course, form openings 110 therebetween for grain to pass through as in concaves 50 and 130. Two bars 160 are axially aligned for each row. One bar 160A extends axially from member 70 to member 74, and the other bar 160B extends axially from member 76 to member 72. Specifically, one bar 160A extends axially from end 162 thereof at member 70 to end 163 thereof at member 74, and the corresponding tongues 117A and 117B are applied to axially aligned slots 105 in members 70 and 74 respectively. The other bar 160B extends axially from end 162 thereof at member 72 to end 163 thereof at member 76, and the corresponding tongues 117B and 117A are applied to axially aligned slots 105 in members 72 and 76 respectively. Each pair of bars 160A and 160B are axially aligned, and the end 163 of bar 160A extending between members 70 and 74 confronts and diametrically opposes the end 162 of bar 160B extending between members 72 and 76. FIG. 13 shows concave 130 as it would appear closed with parallel rows of two bars 160A and 160B each. FIG. 14 shows concave 130 as it would appear open to allow independent installation and removal of the various bars 160. FIG. 15 is a view similar to that of FIG. 14 illustrating two corresponding bars 160A and 160B to make a row of two bars detached from frame 52 in preparation for installation. To install these detached bars 160 into the axially aligned set of slots 105 in members 70, 72, 74, and 76, one bar 160A is positioned to axially align tongues 117A and 117B with axially aligned slots 105 in members 70 and 74, and bar 160A is then moved axially along its longitudinal axis in the direction of arrowed line G to set tongues 117A and 117B into slots 105 of the respective members 70 and 74. To detach bar 160A from frame 52, this operation need only be reversed. The other bar 160B is, in turn, positioned to axially align tongues 117A and 117B with axially aligned slots 105 in members 76 and 72, and bar 160B is then moved axially along its longitudinal axis in the direction of arrowed line H to set tongues 117A and 117B into slots 105 of the respective members 76 and 72. To detach bar 160B from frame 52, this operation need only be reversed. After bars 160A and 160B of each parallel row of bars 160A and 160B are so removably installed on frame 52, frames 51 and 52 may be adjusted via pivoting from the open position in FIG. 14 to the closed position in FIG. 13, and then secured with the corresponding nut-and-bolt fasteners in the closed position so as to ready concave 130 for threshing.

Figure 22:
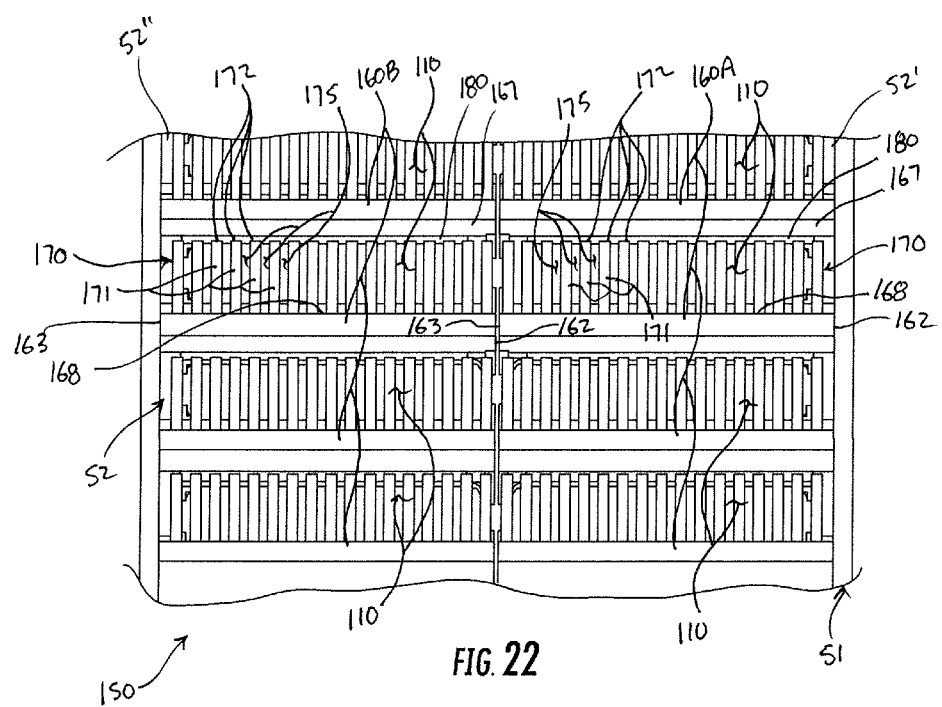
FIG. 22 is a top plan view of a section of the embodiment of FIG. 13 illustrating the outer frame capturing rows of bars carried by the inner frame.
Figure 23:
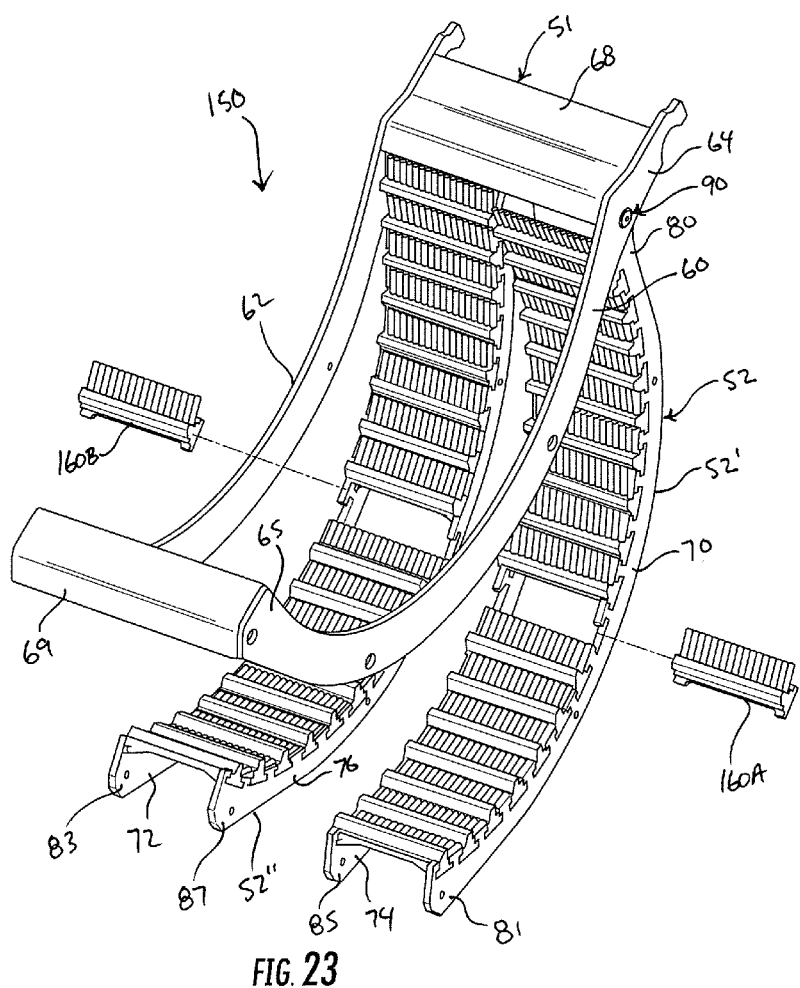
FIG. 23 is a perspective view of an alternate configuration of the embodiment of FIG. 14.

In the nested or closed position of frame 52 defining the closed position of concave 150 in FIGS. 13 and 22, frame 51 restricts or otherwise restrains the rows of bars 160 from moving between installed and released positions. Specifically, in the nested or closed positions of frame 51, curved end member 60 of frame 51 that extends parallel to and is axially juxtaposed along the outer side of curved end member 70 of frame 52 closely confronts and makes direct contact against ends 162 of bars 160A extending between member 70 and member 74, and curved end member 62 of frame 51 that extends parallel to and is axially juxtaposed along the outer side of curved end member 72 of frame 52 closely confronts and makes direct contact against ends 163 of bars 160B extending between members 72 and 76, whereby curved end members 60 and 62 act as curved stops axially spaced from one another and juxtaposed on either side of the respective curved end members 70 and 72 of frame 52 and the respective ends 162 and 163 of the respective bars 160A and 160B capturing each row of bars 160A and 160B therebetween to restrict movement of bars 160 between their installed and released positions, and which also prevents the ability to install one or more bars 160 on frame 53 should one or more be inadvertently missing.

In the installed position of the various bars 160 on frame 52 of concave assembly 150 in reference to FIGS. 20-22, the grate 170 of each bar 160 extends from front 168 across an adjacent opening 110 to back 167 of an adjacent bar 160 for separating grain at the corresponding opening 110 from threshed crop material. Specifically, the grate 170 of each bar 160 extends from front 168 thereof across an adjacent opening 110 to back 167 of an adjacent bar 160 and is in direct contact against the shoulder 180 of the adjacent bar 160. And so each grate 170 of one bar 160 extends across an adjacent opening 110 to the adjacent bar 160 where it rests against the shoulder 180 of the adjacent bar 160. More specifically, fingers 171 of each bar 160 are parallel relative to members 60, 62, 70, 72, 74, and 76 and extend across the adjacent opening 110 to free ends 172 at the adjacent bar 160, which are in direct contact so as to rest against the shoulder 180 of the adjacent bar 160. Grates 170 thus form a continuity at openings 110 between the bars 160 of adjacent rows of bars 160. Grain falls concurrently through openings 175 between fingers 171 and each corresponding opening 110 between adjacent rows of bars 160 for separating grain from threshed crop material. Openings 175 of each grate 170 reduce the corresponding opening 110 size for smaller grains. In the rotary processing unit, bars 160 extend parallel to the axis of rotation of the rotating threshing drum, and fingers 171 of the grate 170 of each bar 160 extend transverse to the axis of rotation of the rotating threshing drum, upper threshing edges 165 extend upward from top edges 70A, 70B, 70C, and 70D of members 70, 72, 74, and 76 of frame 52 to provide aggressive threshing of the harvested crop and grate openings 175 and openings 110 between bars 160 are for grain to pass through and for separating grain from threshed crop material. Should any bars 160 become worn or damaged so as to require replacement or repair, or should the fingers 171 of the separating grate 170 of any bars become worn or damaged so as to require replacement or repair, frame 52 may be adjusted from its closed position in FIG. 13 to its open position in FIGS. 14 and 15 to allow any of the bars 160 needing replacement or repair to be easily removed, repaired or replaced, and reinstalled, in accordance with the principle of the invention.

In concave 150 as in concave 130, members 70 and 72 are considered one frame or otherwise a sub-frame 52' of frame 52, and members 72 and 76 are considered another frame or sub-frame 52" of frame 52. Frames 52' and 52" are, of course, connected together for movement of frame 52 between the closed position of the frame assembly the open position of the frame assembly as herein specifically described. Again, as discussed in conjunction with concave 130, should bars 160 become worn or damaged so as to require replacement or repair, nut-and-bolt fasteners 92, 94, and 98, as illustrated in FIG. 8, are simply removed, and frame 52 is pivotally moved downwardly to the open position as in FIGS. 14 and 15. If desired, nut-and-bolt assemblies 78 in FIG. 2 connecting members 74 and 76 may be removed along with nut-and-bolt assembly 98 connecting ends 85 and 87 of members 74 and 76 to frame 51 to release frame 52' from frame 52" as in FIG. 12 to allow independent pivotal movement of frames 52' and 52" from open positions as in FIG. 22 to the closed positions as in FIG. 13, at which point the various nut-and-bolt assemblies 92, 94, 78, and 98, depicted in FIG. 2, may be re-installed to secure concave 150 in the closed position in FIG. 13 in preparation for threshing. With this arrangement, nut-and-bolt assemblies 78, 92, and 98 may be removed to release frame 52' from frames 51 and 52" to allow pivotal movement of frame 52' from its closed position to its open position independently of frame 52" to allow a user to service bars 160 of frame 52', after which frame 52' may be pivoted back to its closed position and secured via nut-and-bolt assemblies 78, 92, and 98 to frames 52" and 51. Moreover, nut-and-bolt assemblies 78, 94, and 98 may be removed to release frame 52" from frames 51 and 52' to allow independent pivotal movement of frame 52" from its closed position to its open position independently of frame 52' to allow a user to service bars 160 of frame 52", after which frame 52" may be pivoted back to its closed position and secured via nut-and-bolt assemblies 78, 94, and 98 to frames 52' and 51.

The grate 170 of each bar 160 of concave 150 includes eighteen axially spaced parallel fingers. Bars having similar constructions with different grate configurations can be used without departing from the invention. As matter of example, FIG. 24 is a perspective view a bar 190 formed with a grate constructed and arranged in accordance with an alternate embodiment of the invention, FIG. 25 is a top plan view of the embodiment of FIG. 24, and FIG. 26 is a side elevation view of the embodiment of FIG. 24, the opposite side elevation view being the same thereof. Like bars 160, bar 190 shares ends 162 and 163, upper threshing edge 165, lower end 166, back 167, front 168, grate 170 formed of axially aligned parallel fingers 171, tongues 117A and 117B, and shoulder 180. In bar 190, grate 170 includes nine axially spaced parallel fingers 171, which are different in cross-section, which are somewhat larger than fingers 171 of bars 160, and which are spaced further apart such that openings 175 of bar 190 are larger than openings 175 of bars 160 for relating to larger grains.

In another example, FIG. 27 is a perspective view a bar 200 formed with a grate constructed and arranged in accordance with an alternate embodiment of the invention, FIG. 28 is a top plan view of the embodiment of FIG. 27, and FIG. 29 is a side elevation view of the embodiment of FIG. 27, the opposite side elevation view being the same thereof. Like bars 160 and 190, bar 200 shares ends 162 and 163, upper threshing edge 165, lower end 166, back 167, front 168, grate 170 formed of axially aligned parallel fingers 171, tongues 117A and 117B, and shoulder 180. In bar 200, grate 170 includes six axially spaced parallel fingers 171, which are generally the same in cross section as in bar 190, which are somewhat larger than fingers 171 of bars 160 and 190, and which are spaced further apart such that openings 175 of bar 200 are larger than openings 175 of bars 160 and 190 for relating to even larger grains.

Attention is now directed to FIGS. 30-38 illustrating another embodiment of a concave 250 constructed and arranged in accordance with the principle of the invention. Referring to FIGS. 30-35 and FIGS. 37 and 38 in relevant part, concave 50 includes frame 251, frame 252, and angle members 253. Angle members 253 carried by frame 252 provide aggressive threshing edges. Angle members 253 are independently removably connected to frame 252 but are not affixed to frame 252, which enables angle members 253 to be selectively and independently attached to or otherwise installed on frame 252 and detached or otherwise released from frame 252 for individual angle member 253 repair or replacement. Frames 251 and 252 cooperate to form a frame assembly, and are connected together for movement between a nested or closed position in FIGS. 30-32, which defines the nested or closed position of the frame assembly and also concave 250, and an open position in FIGS. 33-35 and 37, which defines the open position of the frame assembly and also concave 250. In the closed position as in FIGS. 30-32, frame 251 interacts with angle members 253 removably connected to frame 252 to entrap angle members 253 between frames 251 and 252 and thereby hold and lock or otherwise secure angle members 253 in place to the frame assembly. In the open position as in FIGS. 33-35 and 37, frames 251 and 252 are spread apart, which frees angle members 253 from the influence of frame 251 allowing angle members 253 to be readily, independently, and selectively removed, detached, or otherwise de-united from frame 252, and readily, independently, and selectively attached, installed, or otherwise connected to frame 252, such as for angle member repair or replacement. Angle members 253 are not affixed to either frame 251 or frame 252, both in the open position and in the closed position of the frame assembly. The assembly of angle members 253 and frame 252 is considered a concave or concave section.

Frame 251 is an outer frame. Frame 252 is an inner frame, in that frame 252 is positioned within frame 251 in the nested or closed position of concave 250. Frames 251 and 252, and angle members 253 are made of the customary steel as is normal in the art of concaves.

Referencing in relevant part FIGS. 30-35 and FIGS. 37 and 38, frame 251 includes members 260 and 262. Members 260 and 262 are end members and are substantially identical and coextensive. Members 260 and 262 are thin and elongate and are axially spaced from one another and extend parallel to one another, and are curved to extend circumferentially about a portion of the rotor of the rotary processing unit. Given that members 260 and 262 are end members and are curved, they may be referred to as either curved members, or curved end members. Curved end member 260 has opposite ends 264 and 265, and curved end member 262 has opposite ends 266 and 267. Transverse support member 268 extends between and is joined to ends 264 and 266 of curved members 260 and 262 via welding, and transverse support member 269 extends between and is joined to ends 265 and 267 of curved end members 260 and 262 via welding. Transverse support members 268 and 269 are relatively thin, elongate plates.

Frame 252 includes members 270 and 272. Members 270 and 272 are substantially identical and coextensive. Members 270 and 272 are thin and elongate and are axially spaced from one another. Members 270 and 272 extend parallel relative to each other, and relative to members 260 and 262. Members 270 and 272 are curved like that of end members 260 and 262 to similarly extend circumferentially about a portion of the rotor of the rotary processing unit. Given that members 270 and 272 are end members and are curved, they may be referred to as either curved members, or curved end members. Members 260, 262, 270, and 272 have matching curvatures. Curved end member 270 has opposed ends 280 and 281, and curved end member 272 has opposed ends 282 and 283. In FIG. 31, frame 252 has spaced-apart, elongate, and parallel struts 286, three in this example, that connect member 270 to member 272. The opposite ends of struts 286 are preferably welded to the respective members 270 and 272.

Frames 251 and 252 are connected together so as to be movable between the nested or closed position in FIGS. 30-32, and the open position in FIGS. 33-35 and 37. Frames 251 and 252 are axially aligned in the closed position. Frames 251 and 252 are spread apart like a clamshell or co-acting jaws for enabling angle member 253 maintenance and replacement in the open position. Curved end member 270 is juxtaposed along, and is in direct contact against, the inner side of curved end member 260, and curved end member 272 is juxtaposed along, and is in direct contact against, the inner side of curved end member 262. End 280 of curved end member 270 is connected to end 264 of curved end member 260, and end 282 of curved end member 272 is connected to end 266 of curved end member 272. The connections of ends 280 and 282 of frame 252 to the respective ends 264 and 266 of frame 251 are pivotal connections, here via nut-and-bolt fasteners 290, that provide concurrent pivotal movement of members 270 and 272 that make up frame 252 between a first position downwardly and away from frame 251 in FIGS. 33-35 and 37 that defines the open position of frame 252 and, moreover, the open position of the frame assembly and of concave 250, and a second position upwardly toward frame 251 as in FIGS. 30-32 that defines the nested or closed position of frame 252 and, moreover, the nested or closed position of the frame assembly and of concave 250. Ends 264 and 280 are pivotally connected with one nut-and-bolt fastener 290, and ends 282 and 266 are pivotally connected with one nut-and-bolt fastener 290. Pivot pins or other forms of pivotal connections or fasteners can be used to pivotally connect ends 280 and 282 of frame 252 to the described connecting points of frame 251 without departing from the invention.

Accordingly, ends 280 and 282 of frame 252 are mounted to frame 251 for pivotal movement, here via nut-and-bolt fasteners 290, for movement between the first or open position of frame 252 extending downwardly and away from frame 251 as in FIGS. 33-35 and 37 so as to define the open position of the frame assembly and of concave 250, and the second or nested or closed position of frame 252 upwardly toward and within frame 251 as in FIGS. 30-32 so as to define the nested or closed position of the frame assembly and of concave 250. In the nested or closed position with reference in relevant part to FIGS. 30-32 and also to FIG. 38, frame 252 is within frame 251, curved end member 270 extends parallel to and is axially juxtaposed along and is in direct contact with the inner side of curved end member 260 that in turn extends parallel to and is axially juxtaposed along the outer side of curved end member 270, and curved end member 272 extends parallel to and is axially juxtaposed along and is in direct contact with the inner side of curved end member 262 that in turn extends parallel to and is axially juxtaposed along the outer side of curved end member 272. Curved end member 270 extends concurrently along the length of curved end member 2260 of frame 251 from end 280 connected to end 264, to end 281 at end 265 at the inner side of transverse support member 269. Curved end member 272 extends concurrently along the length of curved end member 262 of frame 251 from end 282 connected to end 266, to end 283 at end 267 at the inner side of transverse support member 269.

Fasteners are used to removably connect frame 252 to frame 251 in the second or closed position of frame 252 defining the nested or closed position of frames 251 and 252 so as to secure concave 250 in the nested or closed position. Specifically, end members 260 and 270 are releasably connected to each other with longitudinally spaced fasteners, here in the form of three nut-and-bolt assemblies 292 and less or more of such assemblies 292 can be used, and end members 262 and 272 are releasably connected to each other with longitudinally spaced fasteners, here in the form of three nut-and-bolt assemblies 294 and less or more of such assemblies 294 can be used.

In FIGS. 33-37, curved end members 270 and 272 of frame 252 have top edges 270A and 272A, respectively, and angle slots 300. Top edges 270A and 272A lie along a common curved surface to extend circumferentially about a portion of the rotor of a rotary processing unit. Angle slots 300 are spaced apart from one another along the lengths of the respective curved end members 270 and 272, between ends 280 and 281 of curved end member 270 and between ends 282 and 283 of curved end member 272. Angle slots 300 are formed in the upper portions of each of the curved end members 270 and 272 below and open at their top edges 270A and 272A, such that the spaced apart angle slots 300 formed curved end member 270 respectively correspond with the spaced apart angle slots 300 formed in curved end member 272. Each one of angle slots 300 has an angle profile. Angle slots 300 are identical in size and shape, wherein the angle profile of angle slots 300 is identical.

In FIGS. 30-38, frame 252 carries angle members 253, which forms a concave or concave section. Angle members 253 are identical, and are spaced from one another and are parallel relative to each other and extend axially between curved end members 270 and 272.

In FIGS. 39-41, each angle member 253 has opposite ends 310 and 311 and is straight in longitudinal extent from end 310 to end 311. Angle member 253 has an angle profile from end 310 to end 311. The angle profile of angle member 253 is the same from end 310 to end 311, and is characterized by a corner segment 312, a straight threshing segment 313 that includes a threshing edge 314, and a straight separating segment 315 that has a separating grate 316. Threshing segment 313 extends upright from corner segment 312 to threshing edge 314. Separating segment 315 extends horizontally from corner segment 312 to separating grate 316. In this example, threshing segment 313 and separating segment 315 are perpendicular relative to one another, defining a 90 degree angle therebetween. Threshing edge 314 extends along the length of angle member 253 between ends 310 and 311, and is the threshing component of angle member 253. Grate 316 extends along the length of angle member 253 between ends 310 and 311, and is the separating component of angle member 253. Grate 316 includes axially-aligned parallel fingers 320. Fingers 320 are axially spaced apart forming openings 321 therebetween. The two outermost fingers 320 at the respective ends 310 and 311 are identical in size and shape, and are somewhat shorter in length compared to the remaining fingers 320 therebetween, which are identical in size and shape. Fingers 321 are equally spaced apart. Openings 321 between the fingers 320 between the outermost fingers 320 at the respective ends 310 and 311 are equal in size and shape and are for grain to pass through. Angle member 253 is formed from a piece of flat stock cut with separating grate 316, which is bent to shape to form the angle profile.

Figure 36B:
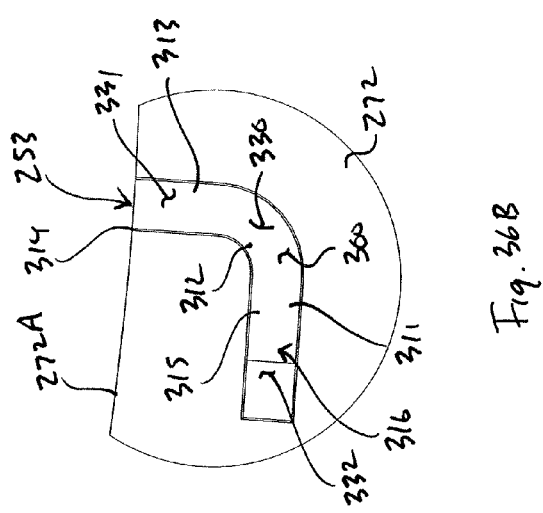

Because each angle member 253 is formed from a piece of flat stock, cut with separating grate 316, that is bent to shape to form the angle profile as described above, each of the angle slots 300 has an angle profile that corresponds to the angle profile of each of the opposite ends 110 and 11 of each one of the angle members 253, in accordance with the principle of the invention. In FIGS. 36A and 36B, the angle profile of each angle slot 300 is characterized by a corner segment 330, and straight segments 331 and 332 that are perpendicular relative to one another, defining a 90 degree angle therebetween. Corner segment 330 of angle slot 300 corresponds to corner segment 312 of angle member 253, straight segment 331 of angle slot 300 corresponds to threshing segment 313 of angle member 253, and straight segment 332 of angle slot 300 corresponds to separating segment 315 of angle member 253. Straight segments 331 are open at top edges 270A and 272A of the respective curved end members 270 and 272 in FIGS. 36A and 36B, respectively, extend downwardly to corner segments 330, and straight segments 332 extend forwardly toward ends 280 and 282 of the respective curved end members 270 and 272.

Each of the opposite ends 110 and 111 of each of angle members 253, the outermost finger 320 and the portion of the corner segment 312 and the threshing segment 313 at each of the opposite ends 110 and 111, is non-destructively and removably held in a respective one of the corresponding angle slots 300 of curved end members 270 and 272. The corresponding angle profiles of angle slots 300 and the opposite ends 110 and 111 of the angle members 253 prevent axial rotation of each of the angle members 253 relative to frame 252. The opposite end 110 and 111 of each angle member 253 extends downwardly through the angle slot 300 straight segment 330 to the corner segment 312 applied to the angle slot 300 corner segment 330, and separating segment 315 extends forwardly through the angle slot 300 straight segment 312 toward ends 280 and 282 of the respective curved end members 270 and 272. Angle members 253 extend between curved end members 270 and 272, from curved end member 270 to curved end member 272, are spaced from one another and extend axially between curved end members 270 and 272 forming openings therebetween for grain to pass through. The threshing edge 314 of each one of the angle members 253 is adjacent or otherwise proximate to the top edges 270A and 272A of the respective curved end members 270 and 272, and the separating grate 316 of each one of the angle members 252 extends across an adjacent one of the openings 340 for separating grain from threshed crop material.

In the installed position of the various angle members 253 on frame 252, the separating grate 316 of each angle member 253 extends across an adjacent opening 340 to proximate to the threshing segment 313 of an adjacent angle member 253 for separating grain at the corresponding opening 340 from threshed crop material. Each separating grate 316 of one angle member 253 extends across an adjacent opening 340 to proximate to the threshing segment 313 of the adjacent angle member 253. More specifically, fingers 320 of each angle member 253 are parallel relative to members 260, 262, 270, and 272, and extend across the adjacent opening 340 to their free ends adjacent to back side of the threshing segment 313 of the adjacent angle member 253. Grain falls concurrently through openings 321 between fingers 320 and each corresponding opening 340 between adjacent rows of angle members 253 for separating grain from threshed crop material. Openings 321 of each separating grate 316 reduce the corresponding opening 340 size for smaller grains. In the rotary processing unit, threshing edges 314 adjacent to top edges 270A and 272A provide aggressive threshing of the harvested crop and openings 321 of the separating grates 316 and the openings 340 between angle members 253 are for grain to pass through and for separating grain from threshed crop material. Should any of angle members 253 become worn or damaged so as to require replacement or repair, or should the fingers 320 of the separating grates 316 of the angle members 253 become worn or damaged so as to require replacement or repair, frame 252 may be adjusted from its closed position in FIGS. 30-32 to its open position in FIGS. 33-35 and 37 to allow any of the angle members 253 needing replacement or repair to be easily removed, repaired or replaced, and reinstalled, in accordance with the principle of the invention.

The angle members 253, including at their opposite ends 310 and 311, are not affixed so as to be immovable using any suitable technique, such as by welding, to curved end members 270 and 272, after seating the opposite ends 310 and 311, one after the other, into the corresponding angle slots 300, which removably connects angle members 253 to frame 252. As a result, angle members 253 are removably connected to frame 252 simply by seating/inserting the opposite ends 110 and 111, one after the other, of each angle member 253 into a corresponding pair of aligned angle slots 300 of the respective curved end members 270 and 272, and readily removed from frame 252 by withdrawing the opposite ends 110 and 111, one after the other, from the respective angle slots 300.

As described above, the angle members 253 are not affixed to frame 252 using any suitable technique, such as by welding, to members 270 and 272, so as to be permanently connected to frame 252, such that the only way to remove them would be to destroy such a permanent connection. The described engagement assembly between each angle member 253 and frame 252 is a non-destructive, removable and impermanent connection, which means that the connection between the various opposite ends 110 and 111 of the angle members 253 and angle slots 300 does not require the destruction of the engagement assembly, such as by cutting, in order to remove the various angle members 253 from frame 252.

Figure 37:
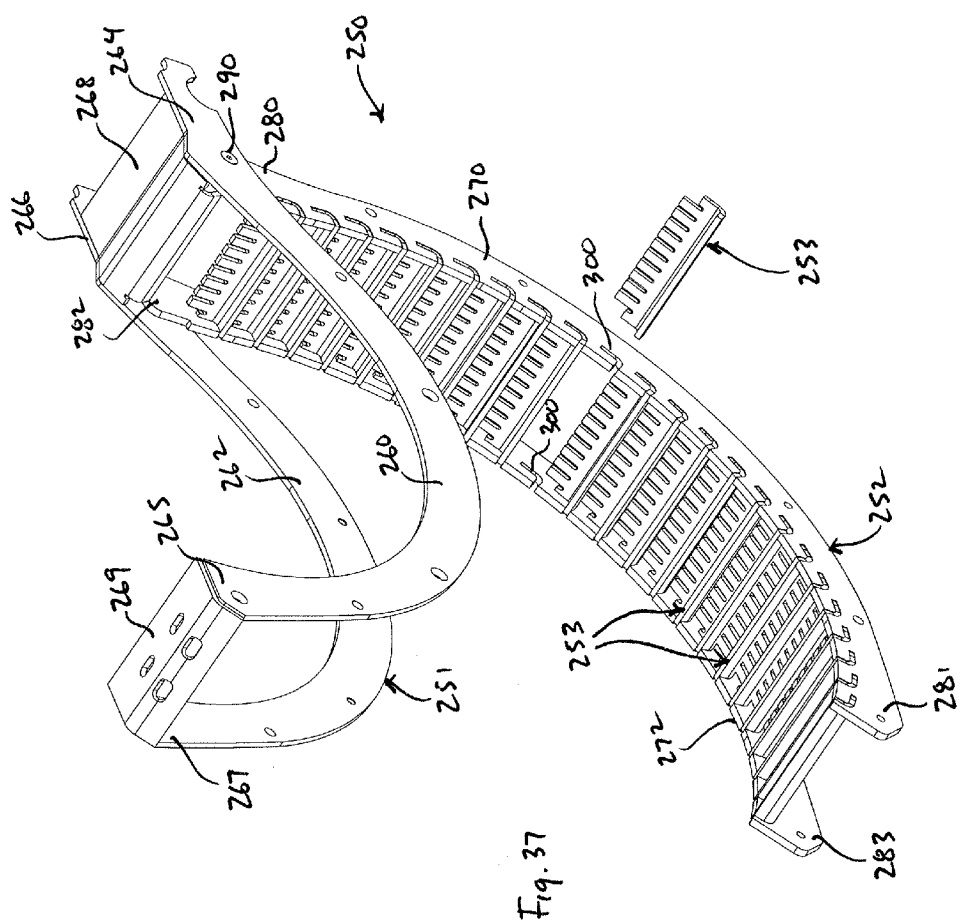
FIG. 37 is a view similar to that of FIG. 33 illustrating an angle member removed from the inner frame.
Figure 38:
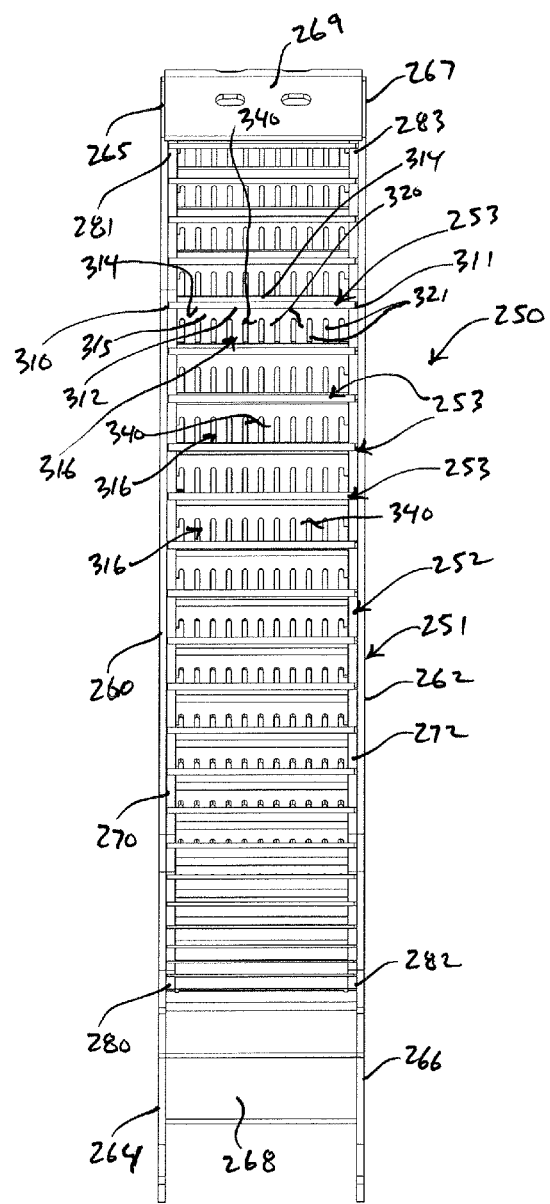
FIG. 38 is a top plan view of the embodiment of FIGS. 30-32.

To removably install angle members 253 on frame 252 in an example, frame 252 is located in the open position as in FIGS. 33-35 and 37, and each angle member 53 is removably connected to frame 252 orienting the angle member 253 between curved end members 270 and 272 and then axially aligning and axially seating the opposite ends 310 and 311, one after the other, into a corresponding pair of axially aligned angle slots 300 by maneuvering the angle member 253 back and forth in one direction to insert one of the opposite ends 110 and 111 into one of a pair of corresponding angle slots 300 and then in another direction to insert the other one of the opposite ends 110 and 111 into the other one of the pair of corresponding angle slots 300. Each angle member 253 is removed by reversing this operation. In FIG. 37, one angle member 253 is shown as it would appear removed from frame 252, and the remaining angle members 253 are shown as they would appear applied to frame 252. The opposite ends 110 and 111 of the installed angle members 253 are substantially flush with respect to the outer sides of the respective curved end members 270 and 272, and the threshing edge 314 of the installed angle members 253 are adjacent to top edges 270A and 272A of the respective curved end members 270 and 272.

In the open position of concave 250 in FIGS. 33-35 and 37, frame 252 is pivoted away from frame 251 so as to extend downwardly and away from frame 251 from ends 280 and 282 connected to frame 251 to ends 281 and 283, which allows the selective installation and removal of angle members 253 with respect to frame 252 without interference from frame 251. In other words, in the open position of concave 250, frame 251 is pivoted away from angle members 253 on frame 252 to allow movement of angle members 253 between their installed and released positions relative to frame 252. Once all of the angle members 253 are installed on frame 252 as in FIGS. 33-35, completion of the assembly of concave 250 done by securing concave 250 into its nested or closed position by pivoting frame 252 upwardly from its open position in FIGS. 33-35 to its nested or closed position in FIGS. 30-32 nested in frame 251, and then securing members 260 and 270 with nut-and-bolt assemblies 292, and securing members 262 and 72 with nut-and-bolt assemblies 294.

In the nested or closed position of frame 252 defining the closed position of concave 250 in FIGS. 30-32 and 38 when concave 250 is assembled, angle members 253 are entrapped by frames 251 and 252. Frame 251 interacts with angle members 253 preventing the opposite ends 110 and 111 of each of the angle members 252 from being non-destructively removed/withdrawn from the corresponding angle slots 300 thereby preventing independent non-destructive removal of the angle members 253 relative to each other from frame 252. However, each of the angle members 253 is not affixed to either frame 251 or frame 252, when concave 250 is assembled in FIGS. 30-32, using any suitable technique, such as by welding, so as to be permanently connected to either frame 251 or frame 252, such that the only way to remove them would be to destroy such a permanent connection. The engagement between each angle member 253 and frames 251 and 252 is non-destructive, removable, and impermanent, which means that the engagement between angle members 253 and frames 251 and 252 does not require the destruction of the engagement, such as by cutting, in order to remove the various angle members 253 from frame 252 and to remove frame 251 from frame 252 and from angle members 253.

In the nested or closed positions of frame 251, curved end member 260 of frame 251 extends parallel to and is axially juxtaposed along the outer side of curved end member 270 of frame 252 and confronts and makes direct contact against ends 110 of angle members 253 on one side of concave 250, and curved end member 262 of frame 251 extends parallel to and is axially juxtaposed along the outer side of curved end member 272 of frame 252 and confronts and makes direct contact against the opposed ends 111 of angle members 253 on the opposed side of concave assembly 250, which interaction entraps angle members 253 by and between frames 251 and 252. Curved end members 260 and 262 act as curved stops axially spaced from one another and juxtaposed on either side of the respective curved end members 270 and 272 of frame 252 and the respective ends 110 and 111 of the respective angle members 253 for entrapping angle members 253 to frame 252 by contacting the respective angle member 253 ends 110 and 111 preventing the angle members 253 from being displaced for, in turn, preventing the opposite ends 110 and 111 of each of the angle members 253 from being non-destructively removed from the corresponding angle slots 300 thereby preventing independent non-destructive removal of the angle members 253 relative to each other from frame 252.

Figure 33:
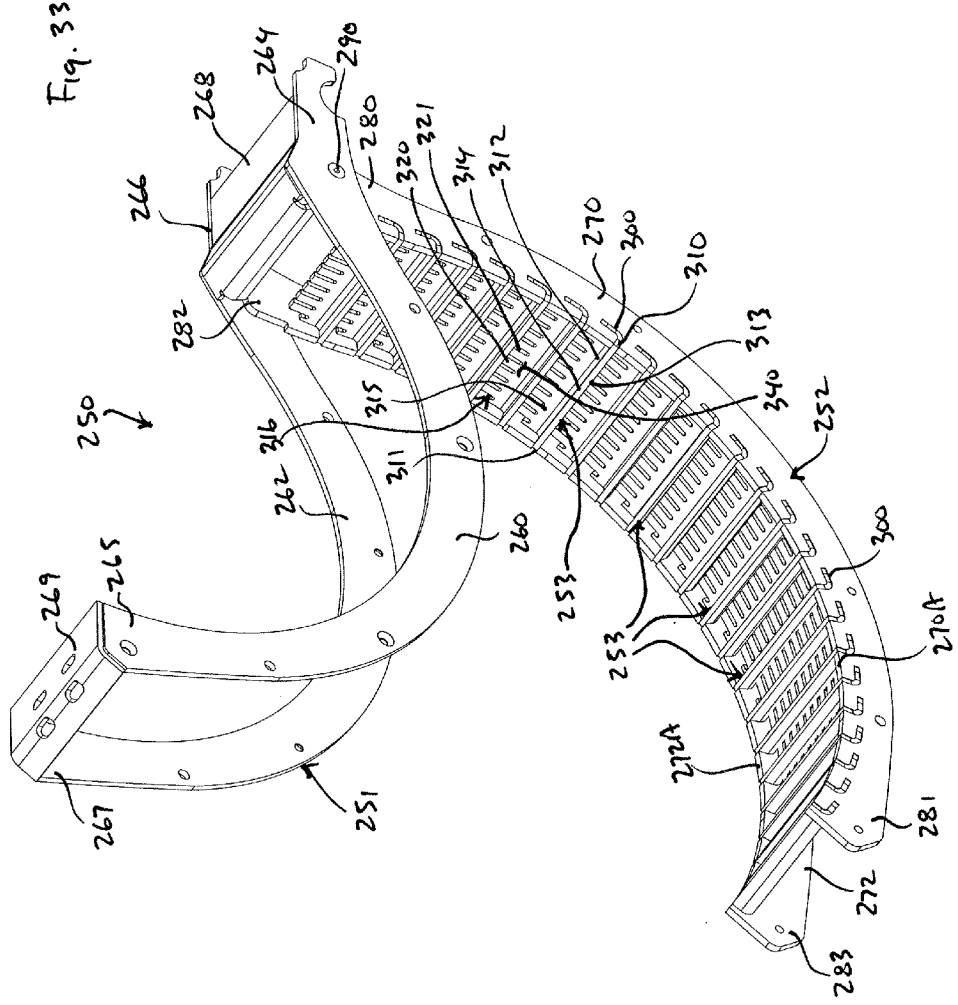

With concave 250 so assembled, concave 250 is ready for threshing in the customary manner in a rotary processing unit. In the rotary processing unit, angle members 253 extend parallel to the axis of rotation of the rotating threshing drum, and threshing edges 314 adjacent to top edges 270A and 272A of curved end members 270 and 272 of frame 252 to provide aggressive threshing of the harvested crop and openings 340 between angle members 253 and opening 321 of the angle member 23 separating grates 316 are for grain to pass through. In a rotary combine, a single concave 250 can be utilized as the concave or multiple shorter concaves 250 can be arranged end-to-end and side-to-side to form the concave. Should angle members 253 become worn or damaged so as to require replacement or repair, nut-and-bolt fasteners 292 and 294 are simply removed to release frame 252 from frame 251, and frame 252 is pivotally moved downwardly from the nested or closed position of frame 252 in FIGS. 30-32 defining the closed position of the frame assembly and of concave 250 to the open position of frame 252 in FIGS. 33-35 defining the open position of the frame assembly and of concave 250 to allow any of the angle members 253 needing replacement or repair to be easily removed, repaired or replaced, and reinstalled, in accordance with the principle of the invention. FIGS. 33-35 show frames 251 and 252 in the open position with the nut-and-bolt assemblies 292 and 294 in FIGS. 30-32 removed. After selected angle members 253 are quickly repaired or replaced and installed on frame 252, frame 252 may then be moved upwardly from its open position in FIGS. 33-35 to its closed position in FIGS. 30-32, and then secured in place with nut-and-bolt assemblies 292 and 294 as to secure the assembled concave 250 in the nested or closed position.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A concave for an agricultural combine, comprising:

a first frame, the first frame includes curved members axially spaced from one another, each of the curved members has a top edge and angle slots formed therein, each of the angle slots includes an angle profile including a corner segment and first and second straight segments, the first straight segment extends downwardly from the top edge to the corner segment, and the second straight edge extends perpendicularly relative to the first straight segment from the corner segment, the angle slots are spaced apart from one another, and the angle slots of one of the curved members correspond with the angle slots of the other one of the curved members;

angle members, each of the angle members has opposite ends, is straight in longitudinal extent from one of the opposite ends to the other one of the opposite ends, and has an angle profile from one of the opposite ends to the other of the opposite ends including a corner segment, a straight threshing segment including a threshing edge, and a straight separating segment having a separating grate, the straight threshing segment extends downwardly from the threshing edge to the corner segment of the angle member, the straight separating segment extends perpendicularly relative to the straight threshing segment from the corner segment of the angle member to the separating grate, and the threshing edge and the separating grate extend between the opposite ends;

the angle members are non-destructively connected to the curved members by each of the opposite ends of each of the angle members being non-destructively held in a respective one of the corresponding angle slots of the curved members, wherein the straight threshing segment of each of the angle members extends downwardly in the first straight segment of a corresponding one of the angle slots from the threshing edge to the corner segment thereof in the corner segment of the corresponding one of the angle slots, and the straight separating segment of each of the angle members extends in the second straight segment of the corresponding one of the angle slots from corner segment thereof in the corner segment of the corresponding one of the angle slots, and the angle profile of each of the angle slots corresponds to the angle profile of each of the opposite ends of each one of the angle members preventing axial rotation of each of the angle members relative to the first frame, the angle members extend between the curved members, are spaced from one another and extend axially between the curved members forming openings therebetween for grain to pass through, the threshing edge of each one of the angle members is adjacent to the top edges of the respective curved members, and the separating grate of each one of the angle members extends across an adjacent one of the openings for separating grain from threshed crop material;

a second frame;

the first frame is connected to the second frame for movement between an open position and a closed position relative to the second frame;

each of the opposite ends of each of the angle members is non-destructively held in the respective one of the corresponding angle slots of the curved members, when the first frame is in the open position relative to the second frame and when the first frame is in the closed position relative to the second frame;

each of the opposite ends of each of the angle members is non-destructively removable from the respective one of the corresponding angle slots of the curved members for enabling independent non-destructive removal of the angle members relative to one another from the first frame, when the first frame is in the open position relative to the second frame; and the second frame restrains each of the opposite ends of each of the angle members from being non-destructively removed from the respective one of the corresponding angle slots of the curved members for disabling independent non-destructive removal of the angle members relative to one another from the first frame, when the first frame is in the closed position relative to the second frame.

2. The concave according to claim 1, wherein the first frame is connected pivotally to the second frame for movement between the open position and the closed position relative to the second frame.

3. The concave according to claim 2, wherein the second frame includes curved stops axially spaced from one another, the curved stops are juxtaposed on either side of the respective curved members on either side of the respective opposite ends of the respective angle members.

4. A concave for an agricultural combine, comprising:
a first frame, the first frame includes curved members axially spaced from one another, each of the curved members has a top edge and angle slots formed therein, each angle slot includes an angle profile including a corner segment and first and second straight segments, the first straight segment extends downwardly from the top edge to the corner segment, and the second straight edge extends perpendicularly relative to the first straight segment from the corner segment, the angle slots are spaced apart from one another, and the angle slots of one of the curved members correspond with the angle slots of the other one of the curved members;
angle members, each of the angle members has opposite ends, is straight in longitudinal extent from one of the opposite ends to the other one of the opposite ends, and has an angle profile from one of the opposite ends to the other of the opposite ends including a corner segment, a straight threshing segment including a threshing edge, and a straight separating segment having a separating grate, the straight threshing segment extends downwardly from the threshing edge to the corner segment of the angle member, the straight separating segment extends perpendicularly relative to the straight threshing segment from the corner segment of the angle member to the separating grate, and the threshing edge and the separating grate extend between the opposite ends;
the angle members are non-destructively connected to the curved members by each of the opposite ends of each of the angle members being non-destructively held in a respective one of the corresponding angle slots of the curved members, wherein the straight threshing segment of each of the angle members extends downwardly in the first straight segment of a corresponding one of the angle slots from the threshing edge to the corner segment thereof in the corner segment of the corresponding one of the angle slots, and the straight separating segment of each of the angle members extends in the second straight segment of the corresponding one of the angle slots from corner segment thereof in the corner segment of the corresponding one of the angle slots, and the angle profile of each of the angle slots corresponds to the angle profile of each of the opposite ends of each one of the angle members preventing axial rotation of each of the angle members relative to the first frame, the angle members extend between the curved members, are spaced from one another and extend axially between the curved members forming openings therebetween for grain to pass through, the threshing edge of each one of the angle members is adjacent to the top edges of the respective curved members, and the separating grate of each one of the angle members extends across an adjacent one of the openings for separating grain from threshed crop material;
a second frame;
each of the opposite ends of each of the angle members is non-destructively held in the respective one of the corresponding angle slots of the curved members, when the second frame is spaced apart from the first frame and when the second frame is juxtaposed relative to the first frame;
each of the opposite ends of each of the angle members is non-destructively removable from the respective one of the corresponding angle slots of the curved members for enabling independent non-destructive removal of the angle members relative to one another from the first frame, when the second frame is spaced apart from the first frame; and
the second frame restrains each of the opposite ends of each of the angle members from being non-destructively removed from the respective one of the corresponding angle slots of the curved members for disabling independent non-destructive removal of the angle members relative to one another from the first frame, when the second frame is juxtaposed relative to the first frame.

5. The concave according to claim 4, wherein the second frame includes curved stops axially spaced from one another, the curved stops are juxtaposed on either side of the respective curved members on either side of the respective opposite ends of the respective angle members.

* * * * *